United States Patent
Oltheten et al.

(10) Patent No.: US 7,414,544 B2
(45) Date of Patent: Aug. 19, 2008

(54) POWER SITUATION INDICATOR

(75) Inventors: Erik Oltheten, Azle, TX (US); Jeffery Erwin, Hurst, TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 186 days.

(21) Appl. No.: 11/338,876

(22) Filed: Jan. 25, 2006

(65) Prior Publication Data

US 2006/0287778 A1   Dec. 21, 2006

Related U.S. Application Data

(60) Provisional application No. 60/647,384, filed on Jan. 28, 2005.

(51) Int. Cl.
*G08B 21/00* (2006.01)
(52) U.S. Cl. ............... 340/946; 340/945; 701/14
(58) Field of Classification Search ......... 340/945, 340/946, 971, 973, 963, 438–441, 449–452; 244/11; 701/9, 14; 73/146 H
See application file for complete search history.

(56) References Cited

U.S. PATENT DOCUMENTS 5,915,273 A   6/1999  Germanetti

FOREIGN PATENT DOCUMENTS

WO    WO 97/42466    11/1997

*Primary Examiner*—Davetta W. Goins
*Assistant Examiner*—Hongmin Fan
(74) *Attorney, Agent, or Firm*—Pillsbury Winthrop Shaw Pittman LLP

(57) ABSTRACT

A power situation indicator configured to provide power information in a rotorcraft is presented. The power situation indicator includes a detection unit configured to detect a current value of each of a plurality of control parameters, each of the plurality of control parameters including a pre-determined operating limit; a calculation unit configured to normalize on a common power scale (a) the current value and (b) the pre-determined operating limit of each of the plurality of control parameters, and a display unit configured to dynamically display on the common power scale a first moveable indicator and a second moveable indicator. The first moveable indicator is driven by one of the plurality of control parameters having the highest normalized current value and the second moveable indicator is driven by one of the plurality of control parameters having its normalized current value that is the closest to its corresponding normalized pre-determined operating limit.

36 Claims, 17 Drawing Sheets

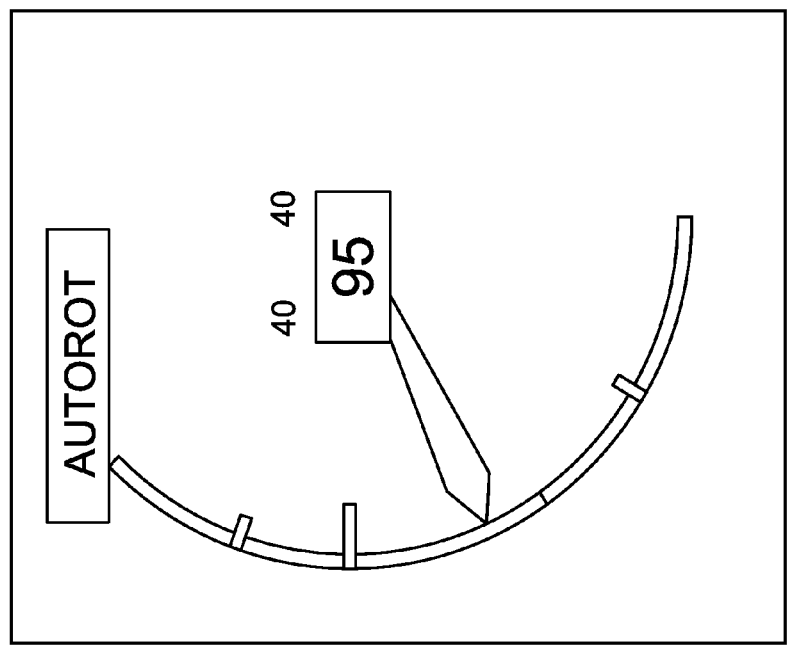
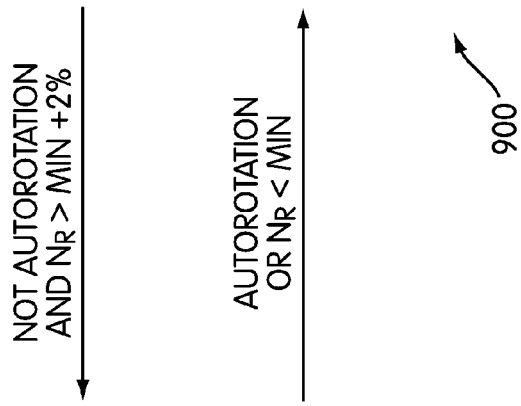
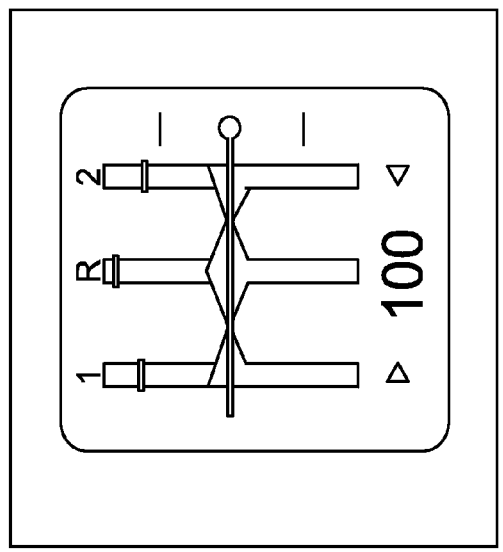
FIG. 9b
FIG. 9a

POWER SITUATION INDICATOR

PRIORITY INFORMATION

This application claims priority to Provisional Patent Application No. 60/647,384, filed Jan. 28, 2005, the content of which is incorporated herein by reference in its entirety.

BACKGROUND

1. Field of the Invention

The present invention relates to an aircraft power situation indicator.

2. Description of Related Art

Flight instrumentation continues to improve, as more and more information becomes available. Terrain elevation data, mapping data, traffic avoidance, and weather information are examples of data that are now routinely provided to pilots during flight. However, as more information becomes available, information overload has increased. It is therefore desirable to limit the display of information only to when it is relevant. This, in turn, has increased the need for the information display to be intuitive, since any information that is presented "part time" is not afforded the luxury of continuous training through familiarity.

While all of these improvements have occurred in the flight instrument regime, power management remains relatively unchanged. This is understandable in the fixed-wing environment, since, simplistically viewed, power is merely an ingredient that ultimately shows its effect in altitude or airspeed.

However, for a rotorcraft, power indication is akin to flight instrumentation in importance. Understanding power in a rotorcraft is essential to properly manage performance, maintain power situational awareness, and prolong component life. Statistics reveal that "internal loss of situation awareness" and "real-time aircraft performance exceeded" are still among the highest causes of fatal helicopter accidents. "Reported power loss" is also among the highest causes of fatal helicopter accidents, although many of these are shown to be unsubstantiated, suggesting that perhaps the pilot did not have a true understanding of how close the power situation was to the limits of operation or authority.

SUMMARY

In an embodiment, there is provided a power situation indicator configured to provide power information in a rotorcraft, the rotorcraft including an engine, the power situation indicator including: a detection unit configured to detect a current value of each of a plurality of control parameters, each of the plurality of control parameters including a pre-determined operating limit; a calculation unit configured to normalize on a common power scale (a) the current value and (b) the pre-determined operating limit of each of the plurality of control parameters, and a display unit configured to dynamically display on the common power scale a first moveable indicator and a second moveable indicator, the first moveable indicator being driven by one of the plurality of control parameters having the highest normalized current value and said second moveable indicator being driven by one of the plurality of control parameters having its normalized current value that is the closest to its corresponding normalized pre-determined operating limit.

In another embodiment, there is provided a method of providing power information in a rotorcraft, the rotorcraft including an engine, the method including: detecting a current value of each of a plurality of control parameters, each of the plurality of control parameters including a pre-determined operating limit; normalizing on a common power scale (a) the current value and (b) the pre-determined operating limit of each of the plurality of control parameters; and dynamically displaying on the common power scale a first moveable indicator and a second moveable indicator, the first moveable indicator being driven by one of the plurality of control parameters having the highest normalized current value and the second moveable indicator being driven by one of the plurality of control parameters having its normalized current value that is the closest to its corresponding normalized pre-determined operating limit.

In an embodiment of the invention, there is provided a machine readable medium encoded with machine executable instructions for providing power information in a rotorcraft including an engine in accordance with a method including: detecting a current value of each of a plurality of control parameters, each of the plurality of control parameters including a pre-determined operating limit; normalizing on a common power scale (a) the current value and (b) the pre-determined operating limit of each of the plurality of control parameters; and dynamically displaying on the common power scale a first moveable indicator and a second moveable indicator, the first moveable indicator being driven by one of the plurality of control parameters having the highest normalized current value and the second moveable indicator being driven by one of the plurality of control parameters having its normalized current value that is the closest to its corresponding normalized pre-determined operating limit.

BRIEF DESCRIPTION OF THE DRAWINGS

FIGS. 9a-b show the change in format of the rotor gauge when autorotation or low rotor RPM of the aircraft is detected, in accordance with an embodiment of the invention;

DETAILED DESCRIPTION

Figure 1:
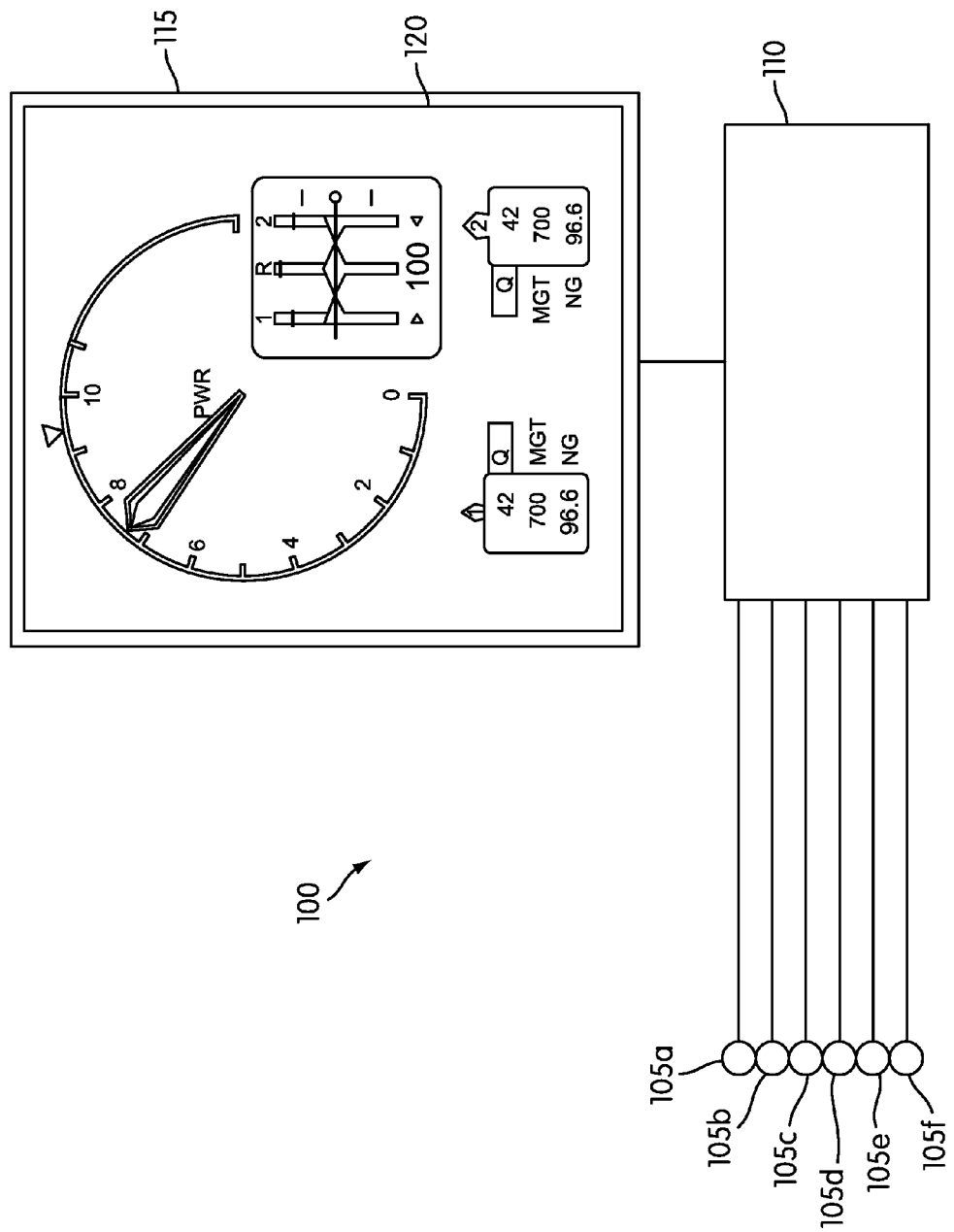
FIG. 1 shows a power situation indicator in accordance with an embodiment of the invention.

In the following embodiments of the invention, the Power Situation Indicator (PSI) will be described in conjunction with a rotorcraft (e.g., helicopter) with at least one turbine engine for driving at least one rotor. However, it will be appreciated that the PSI could be used in other types of aircraft.

The power situation indicator (PSI) in embodiments of the present invention is configured to provide power indication as a function of flight conditions. Examples of flight conditions for a twin-engine rotorcraft include the all engine operative flight mode (AEO), one engine inoperative flight mode (OEI), non-governing modes (including preflight, run-up and shutdown), and autorotation. Examples of flight conditions for a single engine rotorcraft include the engine operative flight mode, non-governing modes (including preflight, run-up and shutdown), and autorotation.

In embodiments of the present invention, the PSI is constructed and arranged to replace the conventional instruments that are used to provide, for example, (a) rotor and power turbine (RPM) information, (b) engine and mast torque (respectively $Q_E$ and $Q_M$), and (c) measured gas turbine temperature and gas turbine speed (respectively MGT and $N_G$).

RPM information is provided by the power turbine speed of the engine (conventionally referred to as $N_p$ or $N_2$) and the main rotor speed (Nr). In flight, with engines operating, these speeds are typically governed to a predetermined RPM or a range of RPMs. The primary aim of the indicating system for RPM is to assure that rotor and power turbine speeds are maintained at the governing speed by the correct application of engine power. Engine torque $Q_E$, measured gas turbine temperature MGT, gas turbine speed $N_G$ and optionally mast torque $Q_M$, are all parameters related to restrictions on the amount of engine power that can be delivered into the helicopter rotor system. Each of the power parameters ($Q_E$, MGT, $N_G$, and $Q_M$) is typically limited to a maximum value and one or more time-limited ranges. Examples of these include a 5-minute range (typically for take-off), a 30-minute range, a 2-minute range, and a 30-second range (typically for OEI operation). The maximum value that a parameter may attain without entering any of these time-limited ranges is referred to as the "Maximum Continuous Power" or MCP limit.

For the PSI, in accordance with an embodiment of the invention, the calculated parameter torque Q replaces engine torque $Q_E$ and mast torque $Q_M$. Engine torque $Q_E$ is the power measured coming out of the engine shaft. Mast torque $Q_M$ is the power measured at the transmission shaft driving the main rotor. In many twin engine helicopters, the mast torque is not measured, and limitations are all expressed in terms of engine torque. In these cases, the parameter Q is equivalent to $Q_E$. When mast torque is measured, it is closely related to the sum of engine torques. The difference between the summed engine torques and the mast torque corresponds to the power provided to, for example, the tail rotor, the hydraulic pumps and other transmission-driven accessories. This difference also accounts for transmission losses. In this case, an algorithm is applied to the difference between the mast torque and the summed engine torques. When the mast torque is the restricting parameter, (which is typically the case for twin engine rotorcraft with all engines operational) this difference is divided proportionally among the engine torque values and applied as a correction. The resulting Q value used by the PSI is slightly less than the measured $Q_E$ such that it reaches the Q parameter limit at the contribution point equivalent to the mast torque limit.

FIG. 1 shows a PSI 100 of a twin-engine rotorcraft in accordance with an embodiment of the invention. The PSI 100 includes a plurality of sensors 105a-f, which are configured to sense various parameters, a calculation unit 110 configured to process data provided by the plurality of sensors 105a-f and a display unit 115. In an implementation, the various parameters sensed by the plurality of sensors 105a-f include the various parameters mentioned hereinabove (i.e., Np, Nr, $Q_E$, $Q_M$, MGT and $N_G$). The display unit 115 includes a screen 120 and is configured to display the data processed by the calculation unit 110 in a specific manner based on the flight modes/conditions of the helicopter.

Figure 2:
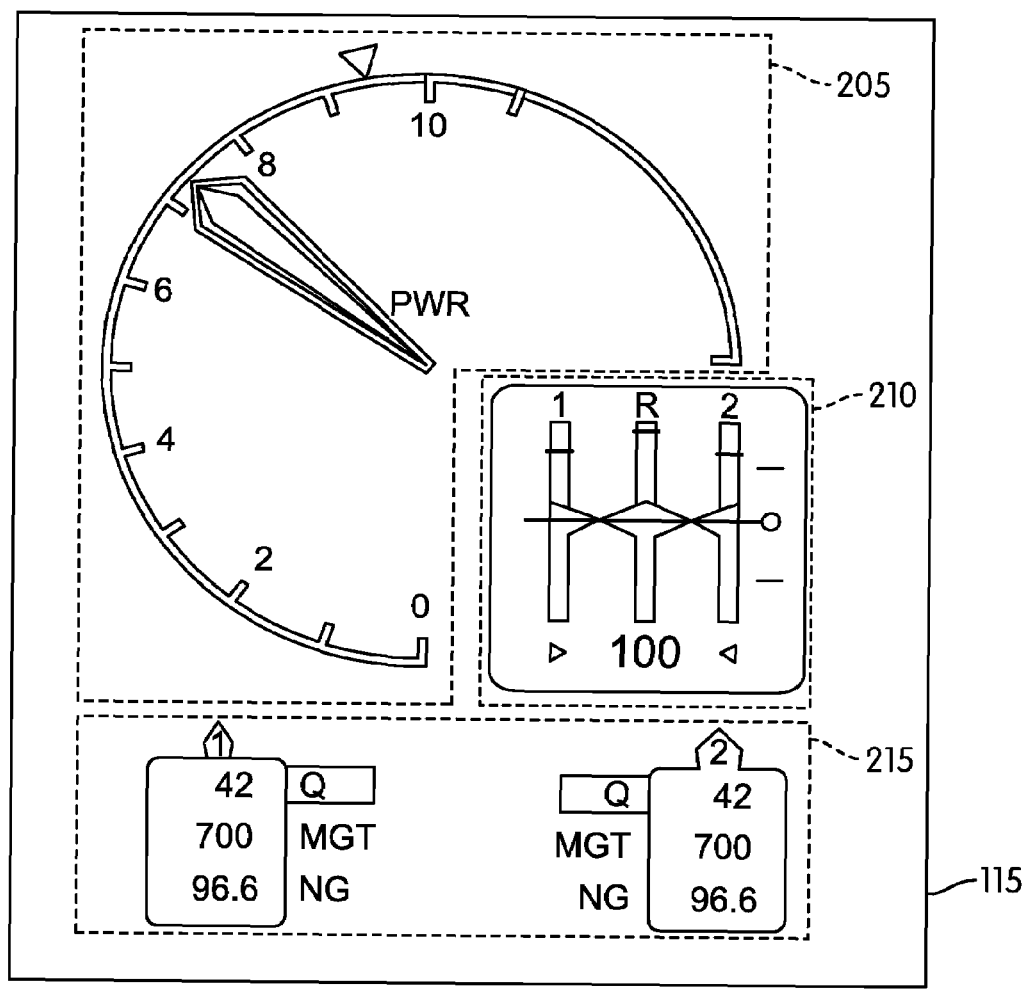
FIG. 2 shows the display unit of the power situation indicator in accordance with an embodiment of the invention.

Referring now to FIG. 2, this figure shows the display unit 115 during an AEO mode in accordance with an embodiment of the invention. The display unit 115 includes a power situation area 205, a rotor situation area 210 and a digital readouts area 215.

Figure 3:
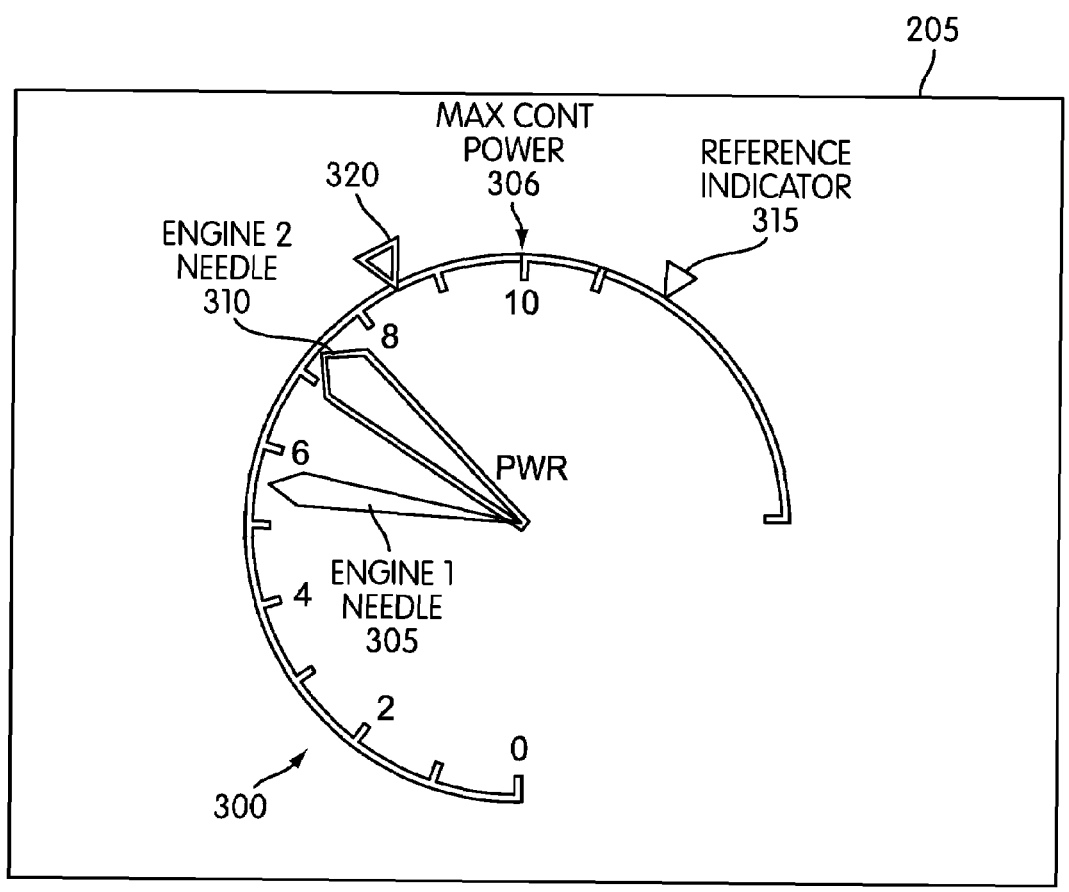
FIG. 3 shows the power gauge of the power situation indicator in accordance with an embodiment of the invention.

As shown in more detail in FIG. 3, the power indication area 205 includes a single power gauge/indicator 300 in round-dial format that describes the power available at a glance. This power gauge 300 may also be referred to hereinafter as a common power scale. An indicating needle 305, 310 is provided for each engine. In FIG. 3, engine 1 is the solid needle, and engine 2 is the hollow, double bar needle. The power gauge 300 is constructed and arranged to provide a combined indication of MGT (Measured Gas Temperature), $N_G$ (Gas Turbine Speed), $Q_E$ (Engine Torque) and $Q_M$ (Mast Torque) in such a way that the relationship between these parameters and several operating limits is known via a single indicating needle.

The numbers 1 through 10 shown on the left side of the power gauge 300 are non-dimensional and are provided for reference only. The indication shown by each needle 305, 310 is a derived indication based on MGT, $N_G$ and Q (Torque). Each parameter is normalized against the scale of the power gauge 300 or common power scale such that the maximum continuous power (MCP) occurs at "10", and idle on a standard day occurs at "3." The MCP point will be referred to hereinafter as the MCP limit 306 of the gauge 300. The position of the needle 305, 310 is driven by the parameter with the highest value on the normalized power gauge 300—which is the first parameter likely to reach the MCP limit 306 (or the one furthest past the MCP limit 306). Conversion to the normalized scale is done in piece-wise linear fashion, so that various engine characteristics and parameter non-linearities can easily be corrected.

Figure 4A:
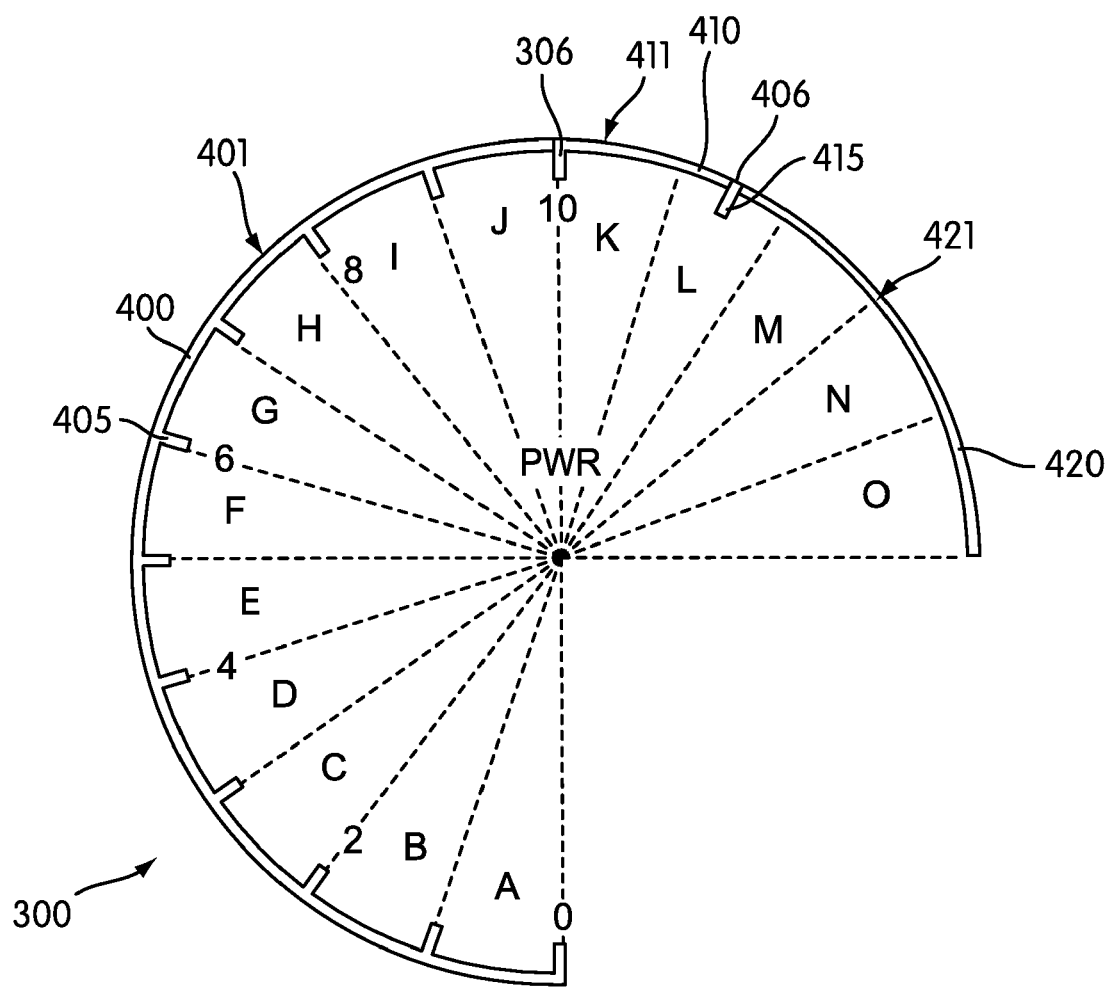
FIG. 4A shows the power gauge of the power situation indicator in accordance with an embodiment of the invention.

Specifically, referring to FIG. 4A, the power gauge 300 comprises fifteen piecewise linear segments A-O, including 10 segments of 18° each on the left (segments A through J) and five segments of 18° each on the right (segments K through O). In an embodiment, segments A through J may be represented by a first colored arc segment (e.g. green) 401 that defines a first zone 400 and are separated by radial tick marks 405 plus one at the beginning of segment A. The end of segment J corresponds to the MCP limit 306, and the end of segment C corresponds approximately to idle.

In FIG. 4A, the power gauge 300 also includes a second colored arc segment 410 (e.g., yellow) that defines a second zone 411 and a third colored arc segment 420 (e.g., grey/red) that defines a third zone 421. The second zone 411 extends from the MCP limit 306 to a moveable second limit 406 denoted by a moveable tick mark or indicator 415. The moveable second limit 406 is driven by both the parameter driving the engine needle and the parameter that is the closest to its operating limit. The moveable tick mark or indicator 415 may be a colored tick mark (e.g., red). The third zone 421 extends from the moveable second limit 406 and tick mark 415 to the end of segment O. In an embodiment, if an indicating needle goes beyond the second limit 406, the arc segment 420 changes color from grey to red. In FIG. 4A, the second zone 411 covers segments K and part of segment L, and the third zone 421 covers the remaining part of segment L through to the end of segment O. However the position of the second limit 406 can be anywhere in segments K through O depending on flight conditions.

During operation of the PSI 100, parameters Q, MGT and $N_G$ are processed to the normalized angular values $Q\alpha$, $MGT\alpha$ and $N_G\alpha$ in the power gauge 300 by the calculation unit 110 using Table 1 and the interpolation formula (a). Table 1 includes the value reached by each parameter $N_G$, MGT and Q at the end of each segment. These values are pre-determined by the calculation unit 110 based on the characteristics of the engine to provide near equivalent angular movement for each parameter from idle (near the end of segment C) to MCP (the end of segment J) for a standard day condition. Segments are scaled differently for AEO versus OEI operation. Segments prior to C are set to provide smooth operation for engine start, and segment beyond J are set to maintain equivalent needle rates through the MCP transition and provide sufficient angular resolution for operation within the time limited zones. For example, in an embodiment, for a specific engine nominal idle values may be $N_G$=66%, Q=12% and MGT=450° C. MCP ratings for AEO operation are $N_G$=97.2%, Q=50% and MGT=850° C. While MCP ratings for OEI operation are $N_G$=99.8%, Q=59% and MGT=925° C. The data (P1-P84) of Table 1 are determined for both the AEO and OEI modes and stored in the calculation unit 110.

TABLE 1

| Segment | Needle Angle (α) | AEO $N_G$ (%) | AEO MGT (° C.) | AEO Q (%) | OEI $N_G$ (%) | OEI MGT (° C.) | OEI Q (%) |
|---|---|---|---|---|---|---|---|
| A - start | 0 | P 1 | P 2 | P 3 | P 43 | P 44 | P 45 |
| A - end | 18 | P 4 | P 5 | P 6 | P 46 | P 47 | P 48 |
| B - end | 36 | P 7 | P 8 | P 9 | P 49 | P 50 | P 51 |
| C - end | 54 | 66.0 | 450 | 12 | 66.0 | 450 | 12 |
| D - end | 72 | P 10 | P 11 | P 12 | P 52 | P 53 | P 54 |
| E - end | 90 | P 13 | P 14 | P 15 | P 55 | P 56 | P 57 |
| F - end | 108 | P 16 | P 17 | P 18 | P 58 | P 59 | P 60 |
| G - end | 126 | P 19 | P 20 | P 21 | P 61 | P 62 | P 63 |
| H - end | 144 | P 22 | P 23 | P 24 | P 64 | P 65 | P 66 |
| I - end | 162 | P 25 | P 26 | P 27 | P 67 | P 68 | P 69 |
| J - end | 180 | 97.2 | 850 | 50 | 99.8 | 900 | 59 |
| K - end | 198 | P 28 | P 29 | P 30 | P 70 | P 71 | P 72 |
| L - end | 216 | P 31 | P 32 | P 33 | P 73 | P 74 | P 75 |
| M - end | 234 | P 34 | P 35 | P 36 | P 76 | P 77 | P 78 |
| N - end | 252 | P 37 | P 38 | P 39 | P 79 | P 80 | P 81 |
| O - end | 270 | P 40 | P 41 | P 42 | P 82 | P 83 | P 84 |

It will be appreciated that the pre-set values occurring at idle and MCP are based on the type of engine used and may, therefore, differ in other embodiments of the invention.

For each parameter ($N_G$, MGT and Q), the value of the needle angle a in degrees is determined using the applicable parameter column, and then the row, "X," is determined in Table 1 such that the parameter value is less than the table entry for row "X," and greater than or equal to the entry of row "(X-1)". The value of a is then determined by the following formula (a):

$$\alpha = \alpha_{x-1} + [\Delta * (P - P_{x-1})/(P_x - P_{x-1})] \quad (a)$$

Where P=parameter value,
Δ=18, the segment size in degrees,
Px=table entry for the parameter value at the end of segment X,
Px-1=table entry for the parameter value at the end of the previous segment, and
αx-1=table entry for the angle at the end of the previous segment.

The position of the needle 305, 310 of each engine is driven by the parameter with the highest value a on the normalized power gauge 300 or common power scale (i.e., $Q\alpha$, $MGT\alpha$ or $N_G\alpha$).

The calculation unit 110 is also configured to determine the normalized difference between the current value of each parameter and its corresponding operating limit. This normalized difference defines an angle position α'. Values $Q\alpha'$, $MGT\alpha'$ and $N_G\alpha'$ are determined by the formula:

$$\alpha' = \alpha_{LMT} - \alpha$$

Where α=the normalized angular value of the parameter calculated above.
$\alpha_{LMT}$=the normalized angular value of the parameter limit if it were processed by the same method as the parameter.

Values of $\alpha_{LMT}$ are fixed for AEO and OEI operation, and thus are pre-determined. Table 2 shows pre-determined operating limits ($N_G$, MGT and Q) for both the AEO and OEI modes in accordance with an embodiment of the invention.

TABLE 2

| Third zone | AEO $N_G$ (%) | AEO MGT (° C.) | AEO Q (%) | OEI $N_G$ (%) | OEI MGT (° C.) | OEI Q (%) |
|---|---|---|---|---|---|---|
| Value | 99.8 | 900 | 50 | 104.3 | 990 | 66.3 |
| $\alpha_{LMT}$ | P85 | P86 | P87 | P88 | P89 | P90 |

The moveable second limit 406 shown in FIG. 4A represents the operating limit that is the closest to the current value of its corresponding parameter ($N_G$, MGT or Q) (i.e., smallest α' value) added to the highest value of a for either engine.

It will be appreciated that operation for AEO mode differs from that for OEI mode. Operation of the power gauge 300 or the common power scale for the AEO mode will now be explained in more detail.

Figure 11:
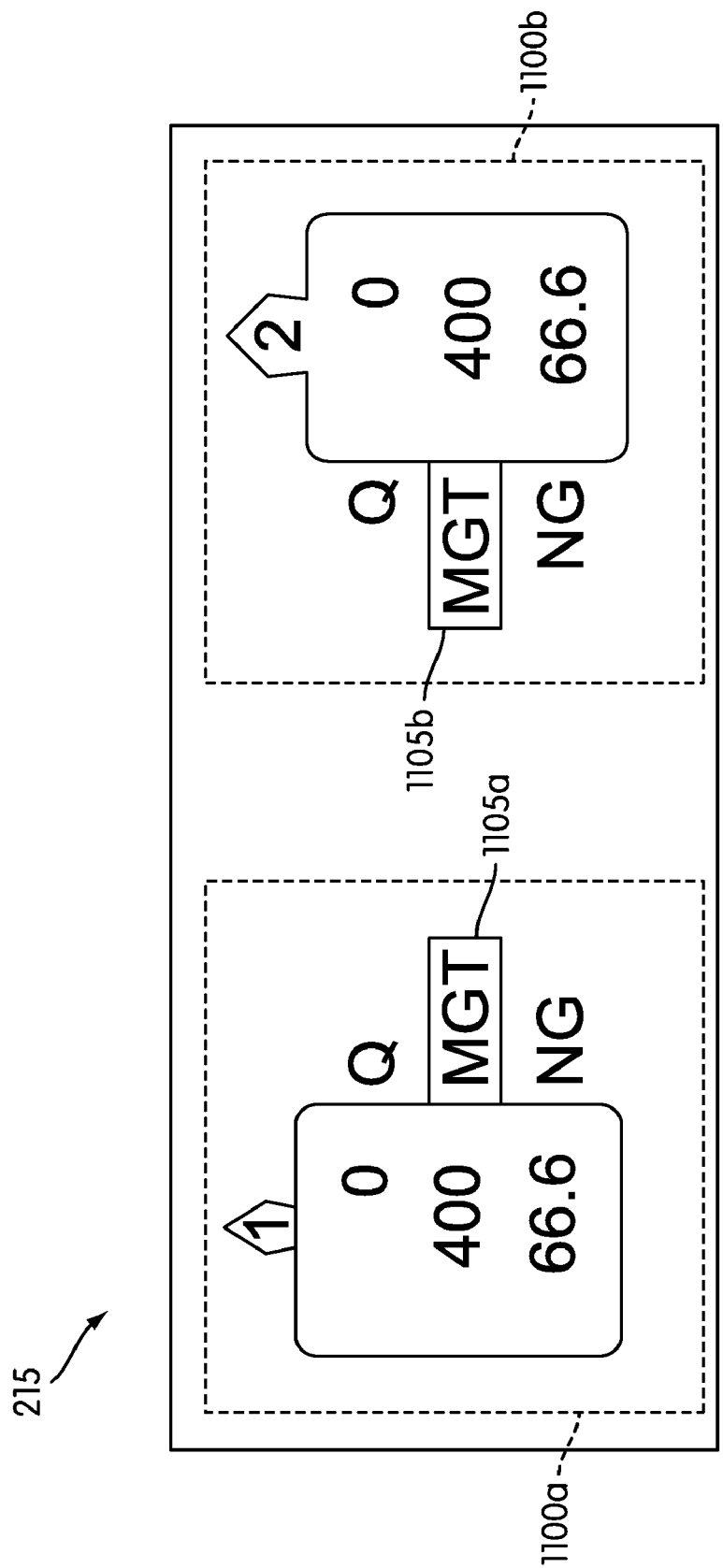
FIG. 11 shows the digital readouts of the power situation indicator in accordance with an embodiment of the invention.

As mentioned previously, once all of the parameters are normalized by the calculation unit 110, the parameter with the highest needle angle value is the one that determines the needle display position. The driving parameter may be indicated by a colored box 1105a, 1105b in the digital readouts area 215, as shown in FIG. 11. Annunciation of the driving parameters on the power gauge 300 may not occur until the new parameter needle angle exceeds the previous parameter angle by at least a predetermined value. In an embodiment, the predetermined value corresponds to three degrees.

In operation, the second and third zones 411, 421 are moveable relative to each other within the 180°-270° range of the power gauge 300 due to changes in value of the moveable second limit 406 (angle α'). Specifically, the size of the second zone 411 and position of the tick mark 415 on the right side of the gauge 300 is dynamic and can move through the 12 o'clock to 3 o'clock position on the scale arc. The position of the moveable second limit 406 or the tick mark 415, and thus the length of the second and third zones 411, 421, is governed by the highest engine needle angle and the parameter closest to its limit on the normalized scale, as defined in Table 2. If this is the same parameter as governing the needle position, then the power gauge 300 behaves the same as a fixed gauge. However, if another parameter begins to approach its operating limit, the moveable second limit 406 or tick mark 415 on the power gauge 300 moves towards the needle. In this way, the PSI 100 not only shows the parameter closest to its MCP, it also shows the margin available to the moveable second limit 406—regardless of the parameter.

Figure 4B:
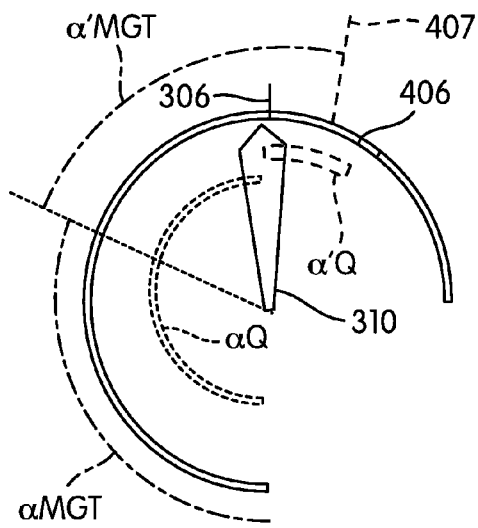
FIGS. 4B-D show the power gauge of the power situation indicator as a function of flight conditions in accordance with an embodiment of the invention.
Figure 4C:
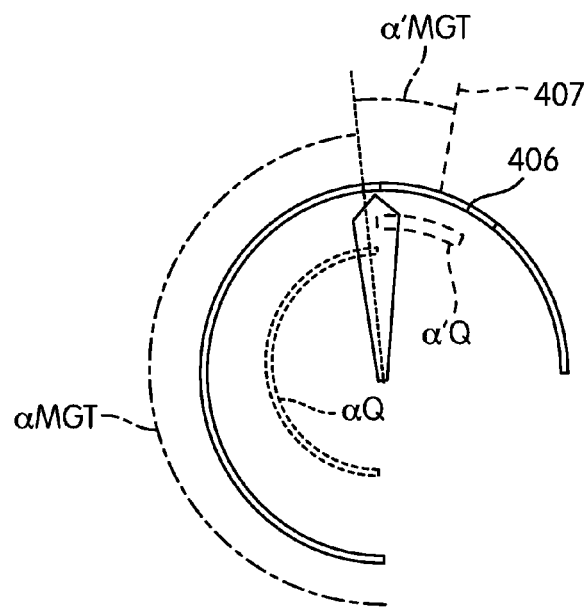
Figure 4D:
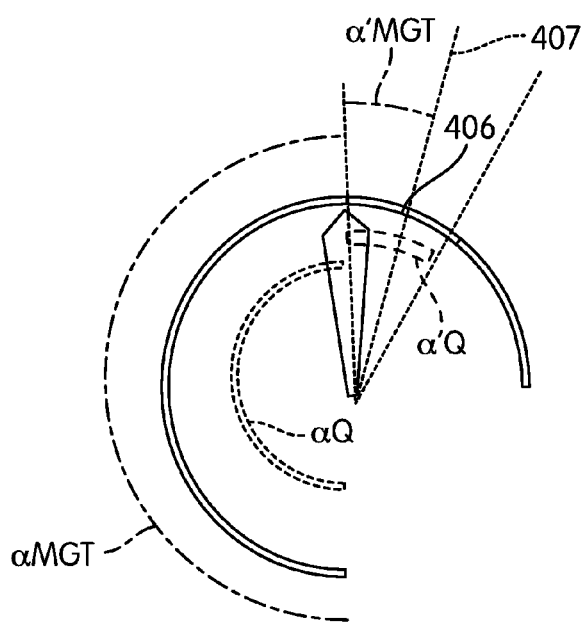

For example, referring to FIGS. 4B-D, these figures show changes of the margin available to the moveable second limit 406 during flight. In order to simplify the following discussion, only one needle (needle 310—engine 2) is represented in FIGS. 4B-D. In FIGS. 4B-D, it is assumed that the normalized torque Q has a 15 degree range between the MCP limit 306 (180°) and its operating limit and that the normalized MGT has a 10 degree range between the MCP limit 306 (180°) and its operating limit. In FIGS. 4B-D, the helicopter climbs out at near the torque MCP rating such that one of the needles 305, 310 (needle 310—engine 2) is almost at the 180° position.

At low altitude, torque Q is the driving parameter and controls the position $\alpha Q$ of the needle 310 and the position $\alpha'Q$ of the moveable second limit 406 (see FIG. 4B). In this case, the moveable second limit 406 is driven by the torque Q. Since the needle 310 is positioned at almost 180°, $\alpha'Q$ substantially equals 15 degrees. FIG. 4B also shows in dashed lines the theoretical positions $\alpha MGT$ and $\alpha'MGT$ of the normalized MGT and the operating limit 407 of MGT on the power gauge 300 at low altitude.

As altitude increases, the MGT rises. When MGT is within 5 arc degrees of the MCP limit 306, the Q and MGT parameters are 15 degrees away from their limit. (See FIG. 4C). In this case, $\alpha'Q = \alpha'MGT$. However, torque Q is still closest to its MCP limit 306 and is, therefore, still annunciated as the driving parameter. But as MGT increases further, its margin to its operating limit decreases. Even though the torque Q does not change, the remaining margin of MGT to its operating limit (i.e., $\alpha'MGT$) has decreased and the second limit 406 or tick mark 405 starts moving down the scale accordingly.

The moveable second limit 406 or tick mark 415 moves down smoothly until it reaches 10 degrees beyond MCP, at which point MGT will have overtaken the torque position on the power gauge 300 and will be annunciated as the limiting parameter. (See FIG. 4D). As can be seen in FIG. 4D, the moveable second limit 406 is driven by MGT. It will be appreciated that the PSI 100 provides a perfectly smooth transition of needle position, limits, and markings. It will also be appreciated that the margin to both limits is always known.

In an embodiment, a five minute take-off timer is displayed whenever an engine needle is within zone 411. One timer is maintained for each parameter for each engine (total of 6). First, timers remain inactive when the PSI is operating in the OEI mode. Second, timer for a parameter is reset to 300 seconds and is inactive when all the parameter value is below the threshold MCP value. Third, when a parameter for an engine is above the threshold, the timer for that parameter is active and decrements in real time with a predetermined resolution, e.g., ¼ second, until reaching zero. Upon reaching zero, the timer expires and remains equal to zero until reset. The active timer with the lowest remaining value is displayed inset within the PSI power scale.

Operation of the power gauge 300 for the OEI mode will now be explained in more detail. In the OEI mode, the failed engine needle and digital readouts may be displayed in grey (i.e., in a color that is different from that of the operating engine needle). The needle position will typically be very low on the scale. This leaves only one needle of concern in the gauge 300. The moving needle corresponds to the remaining, active engine.

For the OEI mode, the gauge 300 operates in the same way as in the AEO mode. Namely, the angle position of the needles 305, 310 for each engine is determined by processing the values of Q, $N_G$ and MGT in accordance with the normalization procedure previously described. This normalization procedure determines the angle position $Q\alpha$, $N_G\alpha$ and $MGT\alpha$ of the parameters Q, $N_G$ and MGT, respectively. In the OEI mode, if no parameter has an angle value a greater than 180°, then the controlling parameter is the one with the largest angle value. However, if one or more parameters has an angle value $\alpha$ greater than 180°, then the controlling parameter is determined based on different timers.

Specifically, in an embodiment of the invention, three timers per parameter (9 timers total—3 parameters) may be used in the OEI mode: a 30 second OEI timer, a 2 minute OEI timer and a 30 minute OEI timer corresponding to each of the time-limited operating ranges. Each timer is defined by its active range of parameter values. Each timer is triggered when the governing parameter is within that range. Table 3 shows the various active ranges for each parameter in accordance with an embodiment of the invention. The timers are listed in the table in priority order: 30 second timers having highest priority and 30 minute timers having the lowest priority.

TABLE 3

| Timer | Q | | | MGT | | | $N_G$ | | |
|---|---|---|---|---|---|---|---|---|---|
| | From % | Peak % | Tran (s) | From % | Peak % | Tran (s) | From % | Peak % | Tran (s) |
| 30 s | 100 | 100 | 0 | 950 | 1100 | 0 | 102.2 | 125.0 | 0 |
| 2 mn | 59 | 99 | 0 | 925 | 960 | 5 | 101.2 | 102.7 | 5 |
| 30 mn | 59 | 59 | 0 | 900 | 950 | 20 | 99.8 | 101.2 | 20 |

In an embodiment of the invention, each timer allows specification of a transient time value "Tran" and operates in accordance with the following rules. First, timers, when reset, are set to their full values and are inactive. Second, when a timer is active, the time decrements in real time with a predetermined resolution (e.g., at least ¼ second) until reaching zero. Upon reaching zero, each timer is expired and will remain fixed at zero until reset.

In an embodiment, timers are activated and reset in accordance with the timer table values and the following logic. First, a timer is reset any time the parameter value is below or equal to the "From" value or above the "Peak" value for more than one second. Second, a timer becomes active any time the parameter value is above the "From" value and below either (a) the "Peak" value, if the transient time "Tran" value is zero, or (b) the "From" value of the next priority timer (30 seconds being the highest). When the transient time "Tran" value is non-zero, then the lowest priority timer is reset and set inactive when the next-higher priority timer becomes active and counts down the number of seconds in the transient time "Tran" field.

Figure 5:
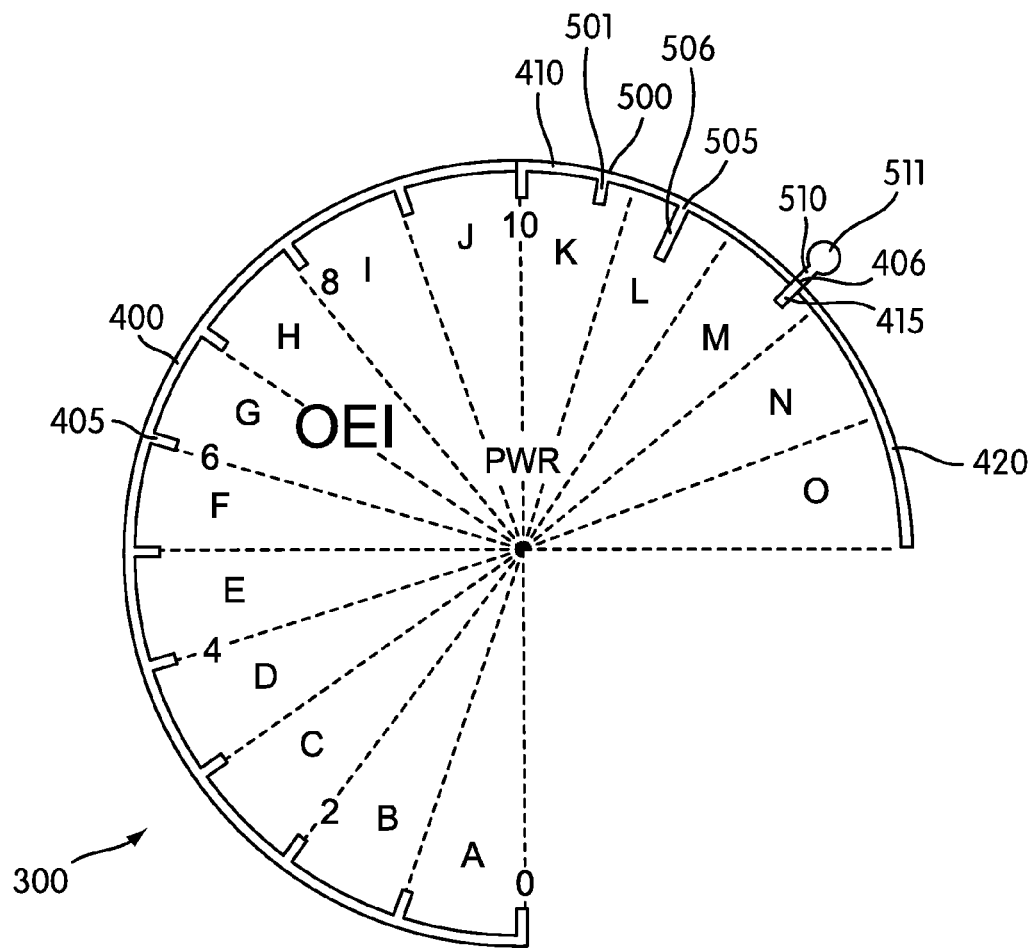
FIG. 5 shows the power gauge of the power situation indicator of FIG. 4A.

In an embodiment, additional radial tick marks may be used in the power gauge 300 to delineate the margin to the 2 minute and the 30 second OEI range for each parameter. FIG. 5 shows a power gauge 300 in OEI format in accordance with an embodiment that includes a third limit 500 represented by the short moveable tick mark 501 and a fourth limit 505 represented by a long moveable tick mark 506. The third limit 500 represents the 30 minute OEI limit and the fourth limit 505 represents the 2 minute OEI limit. Beyond the third limit 500, the timer is within the 2 minute range and beyond the fourth limit 505, the timer is within the 30 second range. The angular values for these limit and tick marks are calculated similarly to that of the second limit 406 and the limit mark 415. For each of these, a value similar to α' is calculated for the normalized angular difference between the parameter value and the limit value. The smallest (or most negative) normalized angular difference is added to the engine needle position to locate the limit position. In an embodiment, the value angles for the fourth and third limits on the power gauge 300 are calculated for each parameter based on the "from" parameter values provided in Table 3 processed to the equivalent normalized angular values.

In an embodiment, the various timers (OEI timers and 5 minute take-off timer) used by the PSI 100 may be presented inside the power indication area 205 In the OEI mode, the highest priority timer with the lowest time remaining established the controlling parameter for the PSI. It is this parameter that establishes the engine needle position 305 or 310 and the associated remaining time that is displayed.

In an embodiment of the invention, in addition to the range markings in OEI, the power indication area 205 may also include a movable fifth limit 510 represented by tick mark 511, which resides outside of the gauge 300, as shown in FIG. 5. The moveable fifth limit 510 and tick mark 511 indicates the setting for automatic limiting provided by the full authority digital engine control (FADEC). FADEC is an electronic system that is used to control an engine. FADEC is configured to (a) govern the engine to a particular speed by controlling the fuel supply and (b) provide automatic limiting to prevent the engine from exceeding its maximum ratings.

For example, if the FADEC is set to 30-second limiting, the fifth limit 510 or tick mark 511 appears coincident with the second limit 406 outside the short tick mark 415 that defines the end of the 30-second zone. When the 2-minute limiting is active, the fifth limit 510 or tick mark 511 moves to the outside of the double-length yellow radial mark 506 coincident with the fourth limit 505 that defines the end of the 2-minute zone. If the FADEC is in manual mode, or limiting is not active, the fifth limit 510 or tick mark 511 is suppressed. In an embodiment, the tick mark 511 is colored either magenta or cyan, depending on the color convention chosen to denote operator selections for the cockpit system.

Referring back to FIG. 3, in an embodiment of the invention, a reference indicator 315 may be provided to indicate various limits. In FIG. 3, the reference indicator 315 is provided as a triangle indicator that rides around the outside of the power gauge 300. Reference indicator 315 may appear during various flight conditions. During engine start, while MGT is the driving parameter, the reference indicator 315 may be used to indicate the hot-start limit. In this implementation, the reference indicator 315 may be red. During flight, the reference indicator 315 may be used to represent the power required for out-of-ground effect (OGE) hover based on temperature, density altitude, and ECU/Heater on/off selections. In this implementation, the reference indicator 315 may be provided with a different color, e.g., white.

In an embodiment, at low airspeed, or at radar altitudes below decision height, a second reference indicator 320, e.g., a hollow white bug, may appear to indicate power required for a 5-foot, in-ground-effect (IGE) hover.

Referring to FIGS. 6-10, the rotor situation area 210 will now be explained.

The rotor situation area 210 is configured to indicate the rotor speed of the helicopter. In the following embodiments, the format of the rotor situation area changes based on the flight conditions (e.g., normal flight, autorotation, start up and faulty conditions).

Figure 6:
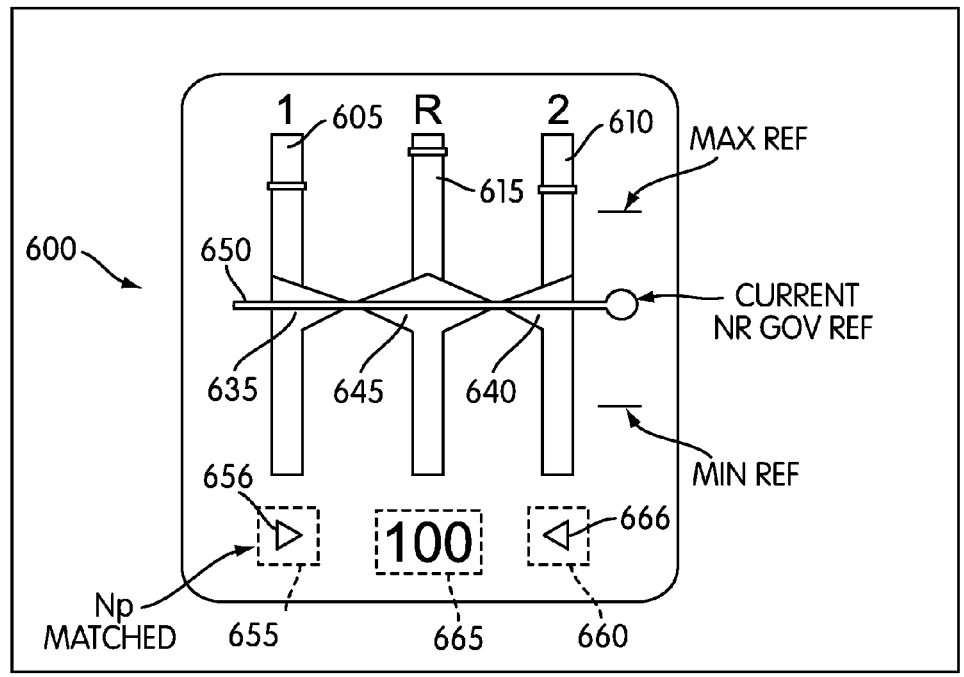
FIG. 6 shows the rotor gauge of the power situation indicator during an all engine operation mode in the normal flight range in accordance with an embodiment of the invention.

FIG. 6 shows the rotor situation area 210 during normal flight conditions, in accordance with an embodiment of the invention. During normal flight conditions, the rotor situation area 210 is displayed within the PSI 100 and includes a bar-graph indicator 600 or common rotor scale 600 that provides indication about the power turbine speed (Np) of each engine, the main rotor speed (Nr) and the governor engine reference speed (Nref). Nr, Nref and Np are all scaled in percentage based on Nr. The engine governor is configured to keep the rotor speed (Nr) equal to the selected value of the governor engine reference speed (Nref) by controlling the engine power turbine speed (Np). The typical optimum rotor speed, which is also the normal governing speed, is typically defined as 100%. Modem helicopters, however, often vary the governing speed to optimize performance in accordance with flight conditions. In these cases the governing speed may vary some percentage above or below the 100% mark. The maximum and minimum values of this variability are referred to as the MAX ref and min REF values.

During normal flight conditions, the bar-graph indicator 600 or common rotor scale is displayed inset in the PSI and includes a first turbine gauge 605 that represents the power turbine speed (Np) of the first engine 1 and a second turbine gauge 610 that represents the power turbine speed (Np) of the second engine 2. The bar-graph indicator 600 also includes a third rotor gauge 615 positioned between the first turbine gauge 605 and the second turbine gauge 610. The third rotor gauge 615 represents the main rotor speed (Nr). The range of the bar graph indicator 600 is limited specifically to the range from the minimum allowed powered rotor speed to a margin beyond the limits of rotor and power turbine speed. This provides maximum display resolution for the range of interest during normal, powered flight.

Figure 7:
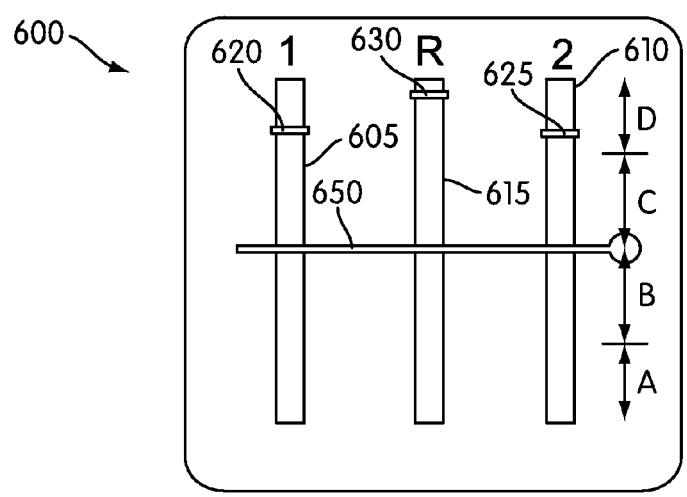
FIG. 7 shows the rotor gauge of FIG. 6.

Referring to FIG. 7, each vertical bar may consist of four piece-wise-linear segments A, B, C, D that may be scaled in accordance with Table 4.

TABLE 4

| Segment | Size (%) | Nr/Np/NRef value (%) |
| --- | --- | --- |
| A - start | 0 | 90 |
| A - end | 20 | 96 |
| B - end | 50 | 100 |
| C - end | 80 | 104 |
| D - end | 100 | 110 |

The end of segment A is denoted as "MIN ref" in FIG. 6. The end of segment C is denoted as "MAX ref" in FIG. 6.

The first and second turbine gauges 605, 610 include a first and a second turbine limit 620, 625, respectively. Similarly, the third rotor gauge 615 includes a rotor limit 630. These limits represent the maximum acceptable limits for the engine power turbine speed (Np) of the first and second engines and the rotor speed. In an embodiment, first and second turbine limits 620 and 625 may be set to 104.5% and the rotor limit 630 may be set to 107%.

Referring back to FIG. 6, bar-graph indicator 600 includes a first, a second and a third pointer 635, 640, 645 that are configured to indicate, respectively, the engine power turbine speed (Np) of the first and second engines and the main rotor speed (Nr). Each pointer of the bar format consists of a filler bar that extends from the bottom of the vertical bar to the height corresponding to the Np and Nr values.

Bar indicator 600 also includes a horizontal bar 650 that represents the governor engine reference speed (Nref). The Nref bar 650 passes across all three vertical bars 605, 610, 615 and is marked to the right by a filled circle. In an embodiment, the Nref bar color is an indication of whether the Nref value is automatically set to the current value, or manually set to the current value. In an embodiment, automatic determination of Nref in accordance to airspeed and altitude is indicated by magenta coloring of the bar and filled circle, while selection to a fixed manual value is indicated by cyan coloring of the bar and filled circle. During normal flight conditions, the governor engine reference speed (Nref) is at a position between the MIN ref and MAX ref positions, and the first, a second and a third pointer 635, 640, 645 match up, as shown in FIG. 6.

The position of the first, second and third pointers 635, 640, 645 and the governor Nref bar 650 is determined by interpolation in the same way as the gauge 300 in the power indication area 205. Specifically, for each parameter Nr/Np/Nref, a segment "X" is determined such that the parameter value is between the table entry defining the end of the segment and the entry defining the end of the previous segment "(X-1)." Then, the normalized value for the parameter is determined by using equation (b)

$$\text{barpercentage} = B_{x-1} + [(B_x - B_{x-1}) * (P - P_{x-1})/(P - P_{x-1})] \quad (b)$$

Where P=parameter value
  Px=table entry for the parameter value at the end of segment X
  Px-1=table entry for the parameter value at the end of the previous segment
  Bx=table entry for the bar percentage deflection at the end of segment X
  Bx-1=table entry for the percentage deflection at the end of the previous segment.

Figure 8A:
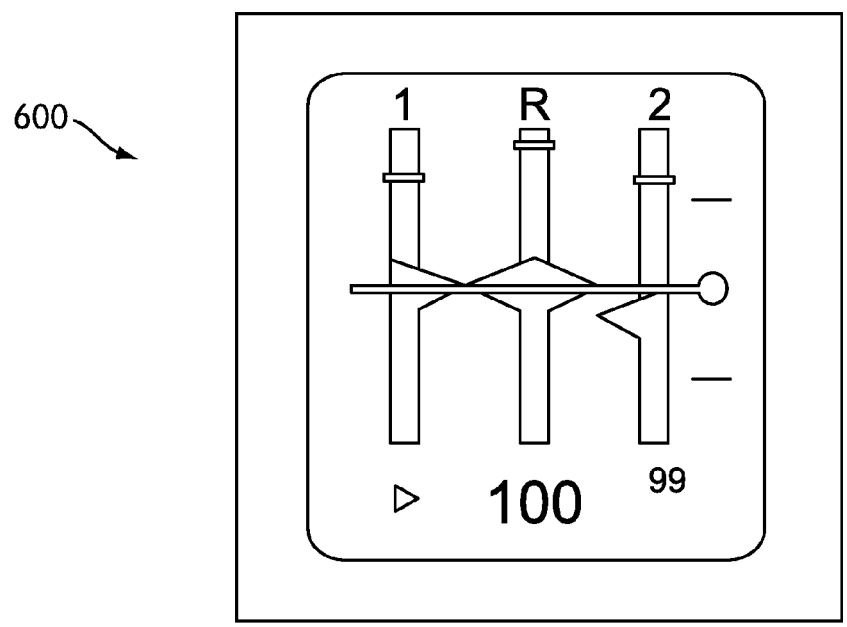
FIGS. 8a-b show the rotor gauge of FIG. 6 during various flight conditions.
Figure 8B:
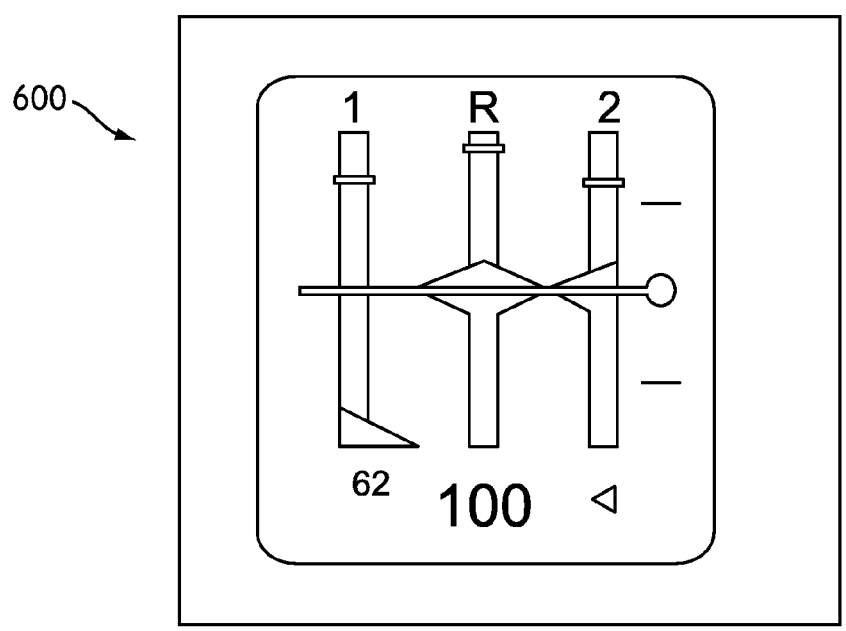

The rotor situation area 210 also includes first, second and third display areas 655, 660 and 665 that are configured to display, respectively, the engine power turbine speed (Np) of the first and second engines and the main rotor speed ($N_R$). The $N_R$ value is displayed in the third display area 665 in large text and may be colored based on the flight conditions. When matched with $N_R$ (e.g., within 0.3 to 0.5% typically), the $N_P$ values of the first and second display areas 665, 660 are suppressed and replaced by triangular symbols 656 and 666, as shown in FIG. 6. When unmatched, $N_P$ digits may be displayed in small text (e.g., in green) aligned under the first and/or the second turbine gauge 605, 610, as shown in FIG. 8$a$. If an $N_P$ indication is out of the range of the vertical scale, the bar pointer is shown half obscured at the bottom of the scale as shown in FIG. 8$b$.

In an embodiment of the invention, various colors may be used to display information in the bar graph indicator 600. For example, the first and second turbine gauges 605, 610, the third rotor gauge 615, and the first, second and third display areas 655, 660 and 665 may be colored in green during normal flight conditions.

However, if the flight conditions change, the following colors may be used for the NR values and the third display area 665: (a) Red—if above limit (c) Yellow—if less than minimum powered droop point (this may be a calculated value based on the number of operational engines and the governor point).

Similarly, when the flight conditions change, the following colors may be used for the power turbine gauges 605 and 610 and the first and second display areas 655 and 660: (a) Red bar with large digits (smaller than NR but larger than the green digits) if above limit, or if a clutch or shaft fails ($N_P > N_R +$ 0.5% for $>\frac{1}{4}$ second), or if a high side failure occurs ($N_P > N_{REF} + 0.5\%$ for $>\frac{1}{4}$ second), (b) yellow bar, when matched with rotor indication that is yellow (below min droop), the gray triangles 656, 666 replacing the digits remain gray in this case, (c) gray bar with gray digits during OEI.

In an embodiment, the PSI 100 is configured to change the format of the rotor situation area 210 when autorotation is detected. The format change is intended to provide the pilot with the best possible presentation of rotor RPM when it is most critical. The new presentation of rotor RPM may also be displayed at lower rotor RPM speeds, i.e., at speeds below the vertical scale range. The format change is beneficial for at least the following reasons. First, the pilot becomes accustomed to seeing the format change on a daily basis. Second, if the pilot ignores a powered rotor droop, the change in format further alerts the pilot that attention needs to be paid to the rotor speed.

During autorotation, no indication matters more than rotor speed $N_R$. Specifically, it is desirable to rapidly convey any changes in RPM speed as a proportion between over-speed and under-speed conditions. During autorotation, the governor reference is not a relevant parameter, and it is desirable to minimize $N_P$ clutter. In an embodiment, the relevant information is most effectively conveyed as a round dial arc with the area of interest (e.g., 80 to 104% in an embodiment) greatly expanded to give the maximum representation and detectability of trend information.

FIGS. 9$a$-$b$ show the change in format of the rotor situation area 210 when autorotation is detected. Specifically, during autorotation, the bar graph indicator 600 or common rotor scale 600 is replaced with an arc indicator 900 or second rotor scale 900.

Autorotation is considered active when the engine is not delivering power to the drive system (e.g., both engine torques $Q_E$ are less than 4%) and when the speed of the rotor $N_R$ exceeds the power turbine speed values $N_P$ of both engines by a margin that indicates the engines are disengaged (e.g., 0.3 to 0.5%). In addition, the speed of the rotor $N_R$ should be greater than the minimum autorotation speed, less a margin (e.g., 75% in an embodiment). In an embodiment, when the arc indicator 900 or second rotor scale 900 is the result of autorotation, an annunciation "AUTOROT" may appear on the rotor situation area 210. In an embodiment, the arc indicator 900 is displayed when the speed of the rotor is below 90%.

Figure 10:
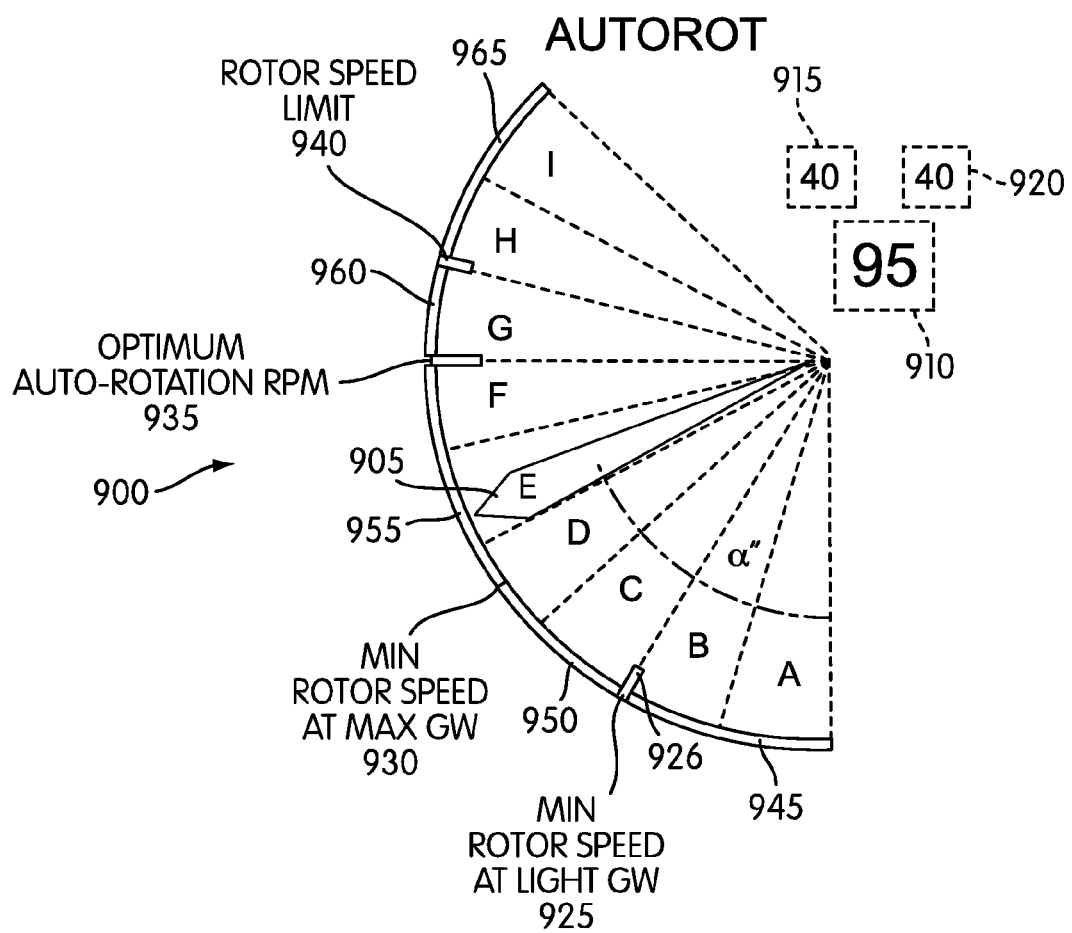
FIG. 10 shows the rotor gauge during autorotation or low rotor RPM, in accordance with an embodiment of the invention.

In an implementation, the arc indicator 900 consists of a 125 degree arc that includes 7 segments A-G of 15 degrees each and two segments H-I of 10 degrees each, as shown in FIG. 10. The arc indicator 900 also includes a needle 905 that indicates the normalized value of the speed rotor $N_R$. The arc indicator also includes a first, second and third display output 910, 915 and 920. First display output 910 indicates the current value of speed rotor $N_R$. The second and third display outputs 915, 920 indicate the current values of the power turbine speed of the first and the second engines.

In an embodiment, the format of the arc indicator 900 is defined by Table 5. The needle 905 is defined by the angle α".

TABLE 5

| Segment   | Angle α" (degree) | Nr value (%) |
|-----------|-------------------|--------------|
| A - start | 0                 | 20           |
| A - end   | 15                | 60           |
| B - end   | 30                | 85           |
| C - end   | 45                | 90           |
| D - end   | 60                | 95           |

TABLE 5-continued

| Segment | Angle α" (degree) | Nr value (%) |
|---|---|---|
| E - end | 75 | 97.5 |
| F - end | 90 | 100 |
| G - end | 105 | 104 |
| H - end | 115 | 107 |
| I - end | 125 | 115 |

The angle α" of the needle 905 is calculated by determining the row "X" in Table 5 such that $N_R$ is less than the table entry for row X, and greater than or equal to the entry for row (X-1). The value of the angle α" is then determined by equation (c):

$$\alpha"=\alpha"_{x-1}+[\Delta*(P-P_{x-1})/(P_x-P_{x-1})] \quad (c)$$

Where: P=the $N_R$ parameter value in percent
  Px=table entry for the Nr value at the end of segment X
  Px-1=table entry for the Nr value of the previous segment
  Δ=15 for segments A-G and 10 for segments H-I
  α"x-1=Table entry for the angle at the end of the previous segment As shown in FIG. 10, the arc indicator 900 also includes a first, second, third and fourth arc limit 925, 930, 935 and 940. The number and meaning of these marks will differ based on the autorotation characteristics for each helicopter. In an embodiment, the first arc limit 925 represents the minimum rotor speed at light gross weight. The first arc limit 925 separates a first arc portion 945 (segments A and B) from the rest of the arc 900. The first arc portion 945 may be colored in red or grey (e.g., red when the needle is within the range, grey otherwise). In an embodiment, the second arc limit 930 represents the minimum rotor speed at maximum gross weight. The second arc limit 930 separates a second arc portion 950 (segment C) from a third arc portion 955 (segments D-F). In an embodiment, the second arc portion 950 is represented in yellow. The third arc limit 935 represents the optimum autorotation speed and is positioned at the speed rotor value of 100%, which corresponds to an angle of 90°. The third arc limit 935 separates the third arc portion 955 from a fourth arc portion 960 (segments F-G). The fourth arc limit 940 represents the rotor speed limit and is positioned at the speed rotor value of 107%, which corresponds to an angle of 115°. The fourth arc limit 940 separates the fourth arc portion 960 from a fifth arc portion 965 (segments H-I). The third and fourth arc portions 955 and 960 are colored in green and the fifth arc portion is colored in grey/red, in an embodiment of the invention. The first, third and fourth arc limits 925, 935 and 940 are represented by tick marks in the embodiment shown in FIG. 10.

Referring now to FIG. 11, this figure shows the digital readouts area 215 of the PSI 100. Digital readouts area 215 includes a first engine digital display 1100a and a second digital display 1100b that provide values of selected parameters for respectively the first and the second engines. Each engine box includes a torque (Q), measured gas temperature (MGT), and gas turbine speed ($N_G$) readout. $N_G$ is in percent RPM and MGT is in degrees centigrade.

Figure 12:
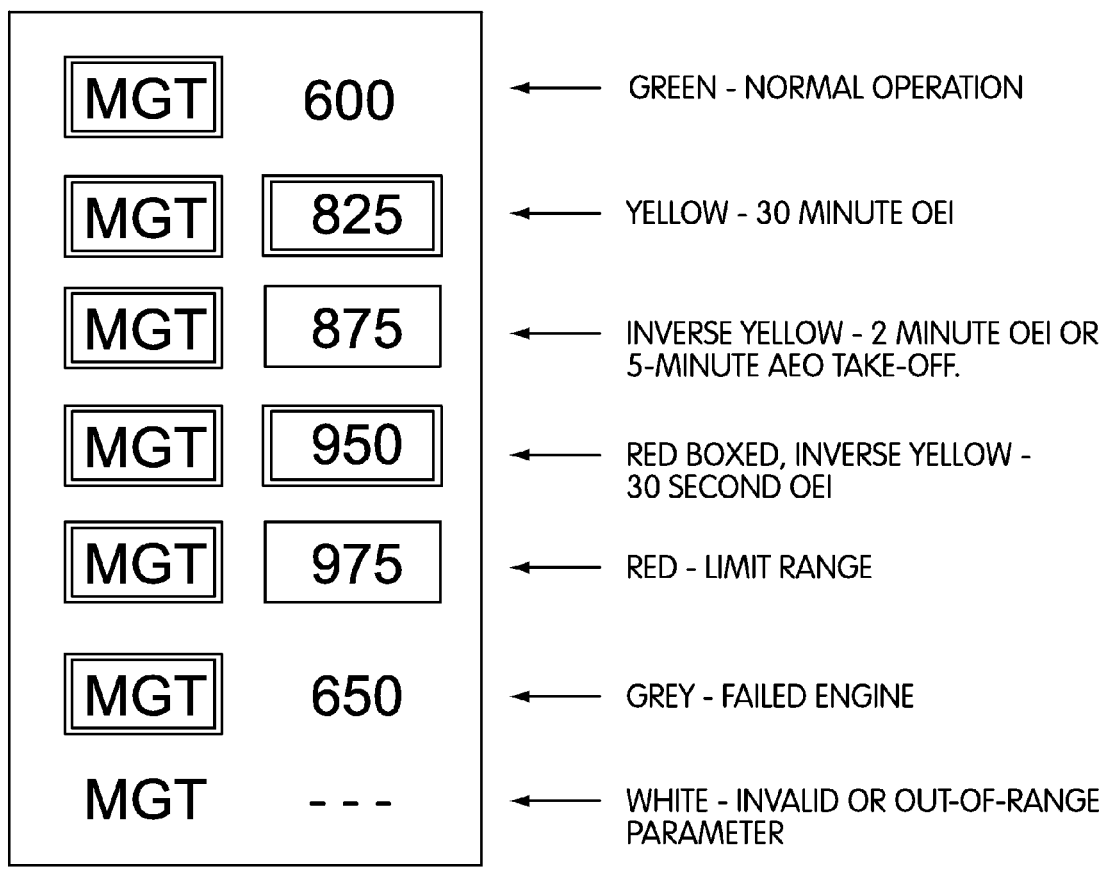
FIG. 12 shows various colorings of the digital readouts displayed by the power situation indicator in accordance with an embodiment of the invention.

The first engine digital display 1100a and the second digital display 1100b include a flag at the top of the box that is in the format of the needle shown in the power indication area: engine 1 has a solid pointer; engine 2 has a hollow pointer. The first and second engine digital displays 1100a, 1100b include, respectively, a first and a second box 1105a, 1105b around the parameter label. First and second boxes 1105a, 1105b indicate the parameter that drives the needle position on the power gauge 300. In an embodiment of the invention, the digital readouts and box colorings change in accordance with the range of operation as shown in FIG. 12.

In an embodiment, the PSI 100 is configured to display special cues and flags to indicate the status of the engine or the flight conditions.

For example, the flag "ENG OUT" appears at the base of the digital display 1100a, 1100b when an engine out condition occurs. The OEI flag appears inside the gauge 300 when an OEI condition occurs (which includes an in-flight engine-out condition or when an intentional roll-back of an engine throttle is performed). When OEI training is active, the "OEI" flag is replaced by "TRNG."

Furthermore, a timer appears in the power gauge for time-limited zones. The timer shown is in accordance with the priority logic, and consists of a label (e.g., 30-SEC) and a time value shown in minutes and seconds. The timer decrements while in the zone to 0:00, at which point the timer value and label change to red, and a master caution tone may be triggered. A master caution tone may be triggered any time the 2-minute or 30-second zone of the gauge is entered.

In addition, when a parameter approaches its limit, the needles, digital read-outs, and associated timer label and value may flash (e.g., at a rate of 2 Hz with 60% duty cycle). This may apply to: (a) time-limited zones with less than ten seconds remaining or (a) a transient operation above the limit.

Moreover, in an embodiment, the power available needle for an engine in manual FADEC mode may appear in cyan as opposed to green. In addition, when the speed of rotor RPM is between the max rotor RPM for rotor brake application and 20%(cut out), and is decreasing, the annunciation "RTR BRK" may appear to indicate that the rotor brake can be applied.

Referring now to FIGS. 13a-f, operation of the PSI 100 during various flight conditions will now be described.

Figure 13A:
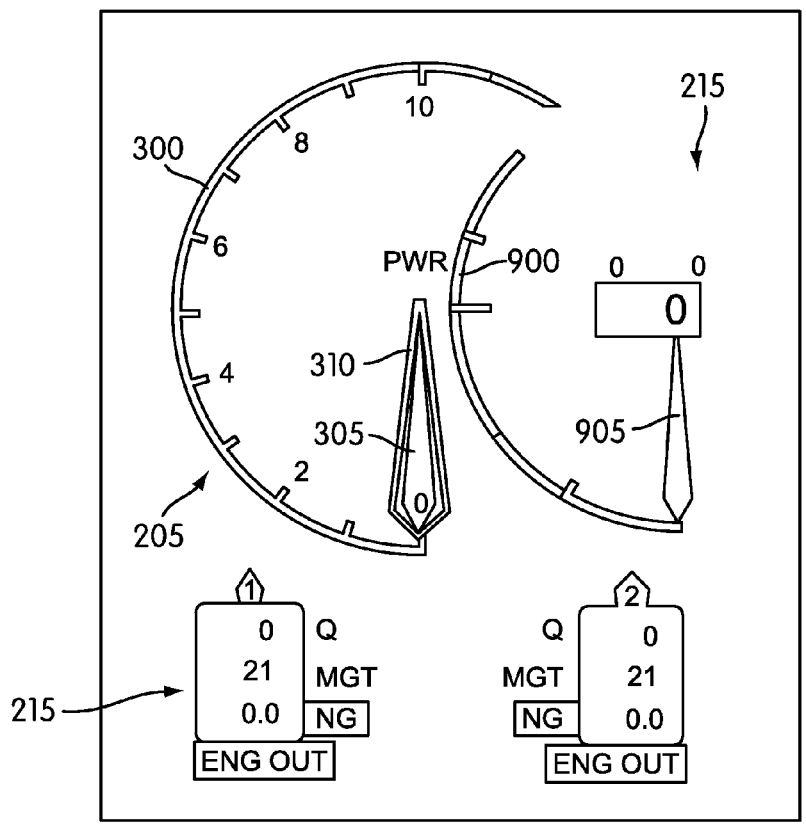
FIGS. 13a-f show the power situation indicator during operation of the aircraft in accordance with an embodiment of the invention.

FIG. 13a shows the PSI 100 at start-up condition. Both needles 305, 310 of the first and second engines point to zero. The rotor situation area 215 includes the arc indicator 900 having its needle 905 also pointing to zero. The flag "ENG OUT" appears at the bottom of the digital readout area 215.

As the starter is engaged, the gas turbine speed Ng will be the driving parameter until light-off. At that time, the gas turbine temperature MGT quickly takes over as driving parameter. The appropriate side $N_P$ and $N_R$ will start to increase.

As the start settles down to idle, the driving parameter on the power gauge 300 will vary based on ambient conditions. The needles will likely be at 3 or slightly above on a hot day. Both turbine speed $N_P$ digits will likely be suppressed, with the gray triangles displayed if the idle is balanced. Assuming one engine is brought up at a time to the FLY position (e.g., engine 1), the rotor speed $N_R$ indication (digits and needle) will increase, while the remaining turbine speed $N_P$ will turn green but remain at the idle value.

Figure 13B:
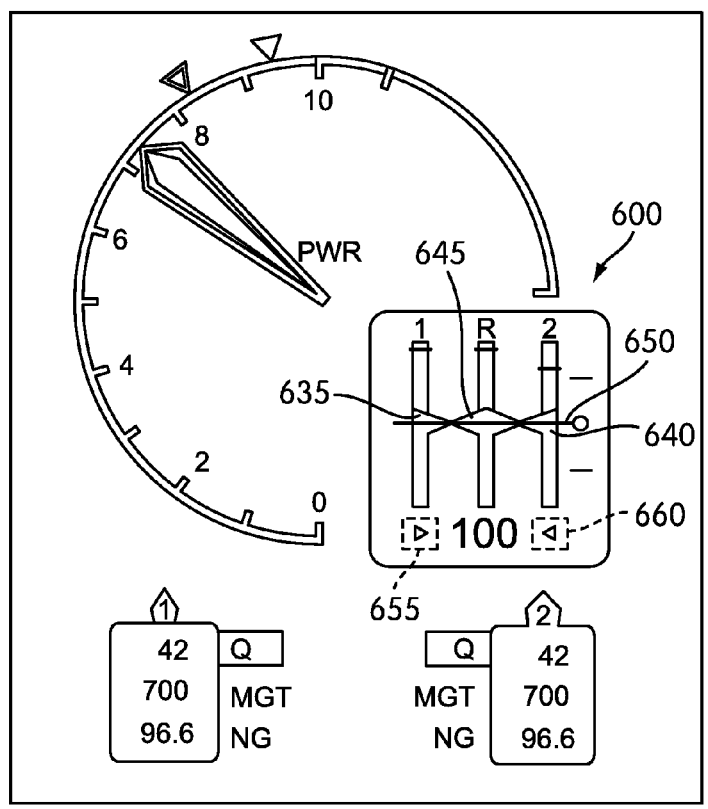

Referring now to FIG. 13b, as the rotor speed $N_R$ reaches the minimum normal operating speed, the bar graph indicator 600 switches in. The rotor and the first engine should settle in line with the Nref governor horizontal bar 650 for the governing point. In that case, the first pointer 635 is aligned with the Nref governor horizontal bar 650. The other turbine speed $N_P$ indication will appear as a green half-pointer 640 with digits in the second display area 660 at the bottom of the scale (not shown in FIG. 13b).

As the second engine is brought up (i.e., engine 2), parameters of the second engine display 1100b increase, and then the second pointer 640 commences motion up to the governor reference point or Nref governor horizontal bar 650. At this point, the second display area 660 of indicating the turbine speed Np of the second engine also reverts to the gray triangle, and the drive system is now steady-state at 100% RPM. (See FIG. 13*b*).

Meanwhile the power indication area 205 has changed, one needle at a time, to somewhere in the 4 to 5 range. As collective pitch is increased, torque Q will likely take over as the driving parameter and the needles 305, 310 will move, matched, into the upper left quadrant of the gauge 300. (See FIG. 13*b*).

Figure 13C:
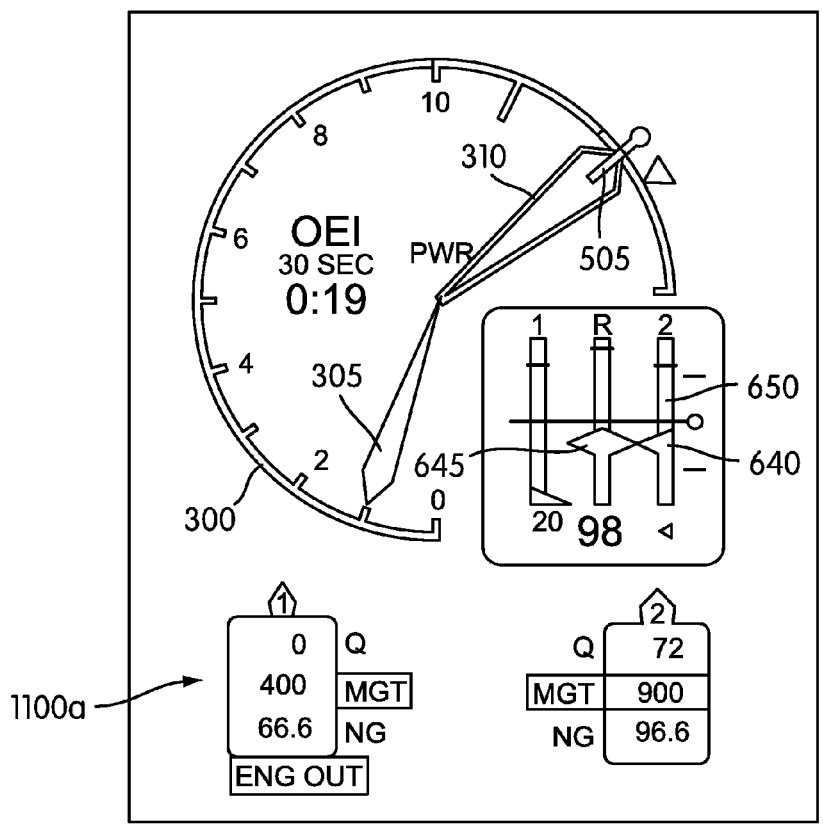

If OEI conditions were to occur during flight, the scale of the power gauge 300 would adjust for OEI MCP at 12 o'clock, and the OEI flag would appear, as shown in FIG. 13*c*. In this case, one needle points to near zero (e.g., needle 305 of the first engine) and the flag "ENG OUT" appears at the bottom of the first engine digital display area 1100*b*.

If power were pulled past the 12 o'clock point, as shown in FIG. 13*c*, the OEI zone label and timer would appear for the 2-minute zone and the timer would commence counting downward from 2:00.

If power were pulled further, past the fourth limit 505, which represents the 2 minute OEI limit, the OEI label would change to 30-seconds, and the timer would commence countdown from 0:30, as shown in FIG. 13*c*. If either timer value gets below 10 seconds, the OEI label, timer value, and engine needle will commence flashing. If collective pitch is further increased, and as the engine operating limit is reached (i.e., needle 310 past the second limit 405), the power needle will stop increasing in response to increasing collective pitch (due to FADEC limiting).

Further increases in collective pitch would result in rotor RPM droop and would be seen as downward movement of the second and third pointers 640 and 645 away from the NREF governor horizontal bar 650. If collective pitch was further increased still, the rotor speed $N_R$ indication and remaining $N_p$ indication of the bar graph indicator 600 would turn yellow. Eventually, the bar graph indicator 600 would change into the arc indicator 900.

Figure 13D:
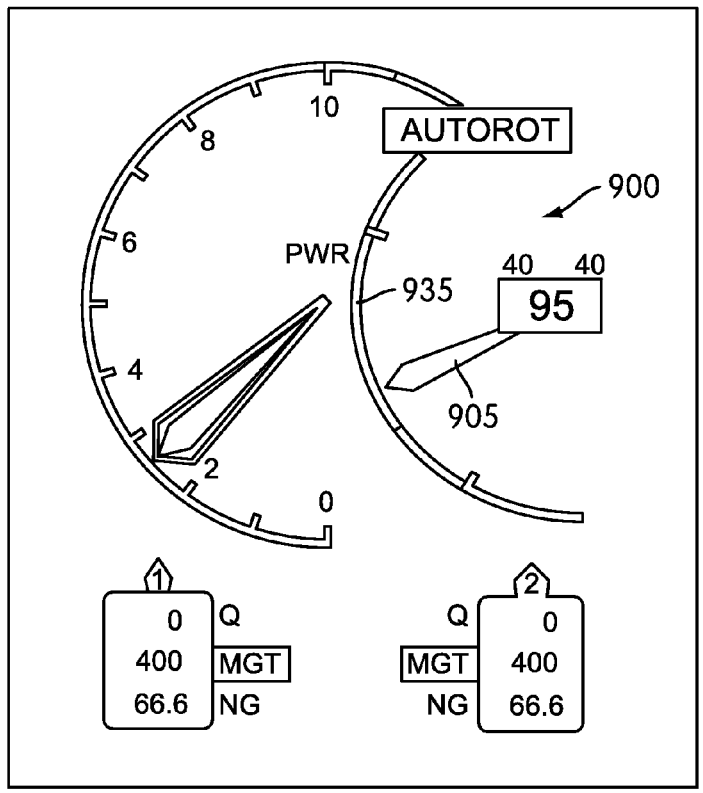

Referring now to FIG. 13*d*, entering an autorotation, the change to the display is very apparent. In FIG. 13*d*, the first and second engines have been reduced to idle and the rotor speed $N_R$ shown in the arc indicator 900 is apparent as being a little less than optimal speed, i.e., below the $3^{rd}$ arc limit 935.

Figure 13E:
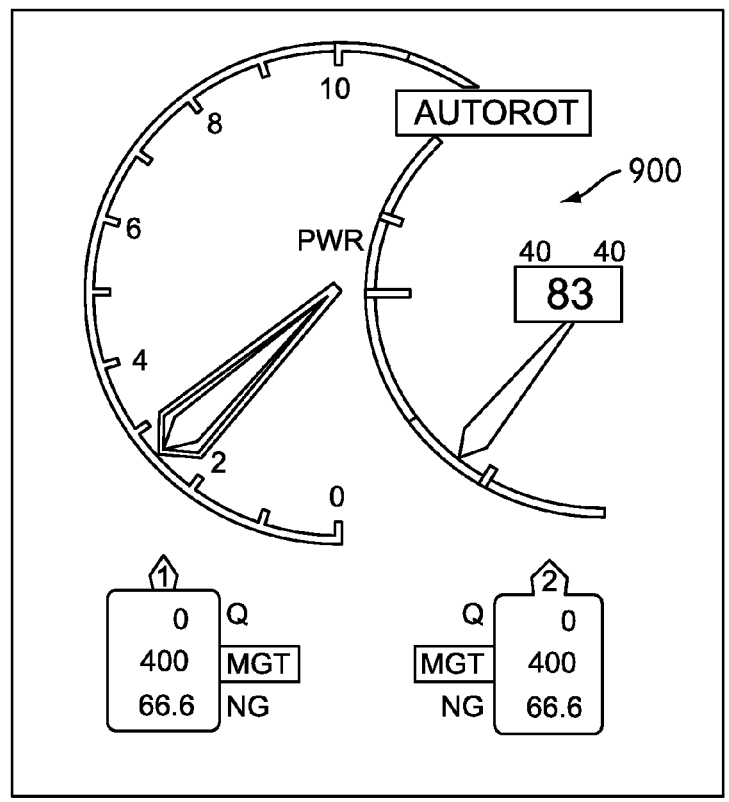
Figure 13F:
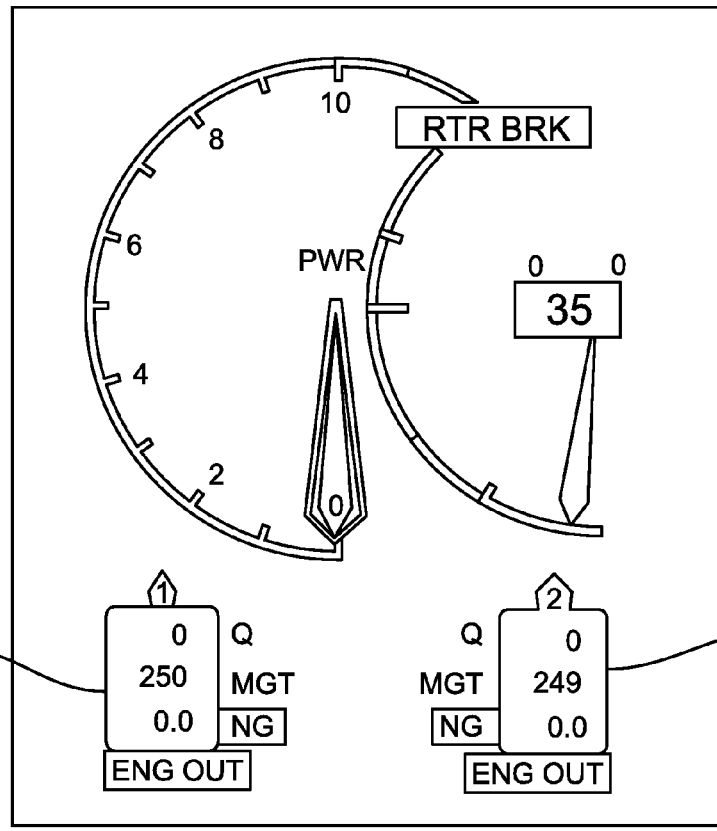

Upon normal landing, as the throttles are reduced to idle and the engine clutches disengage, the arc format 900 will again appear, as shown in FIG. 13*e*. As the rotor speed $N_R$ goes into the red, the "AUTOROT" indication is suppressed.

As the engines are shut down, the "ENG OUT" indications will appear under the first and second display areas 1100*a*, 1100*b*, as shown in FIG. 13*e*. As the rotor speed Nr further slows to below the maximum brake application speed, the annunciation "RTR BRK" will appear to signify that the brake can be applied (see FIG. 13*f*).

Figure 14A:
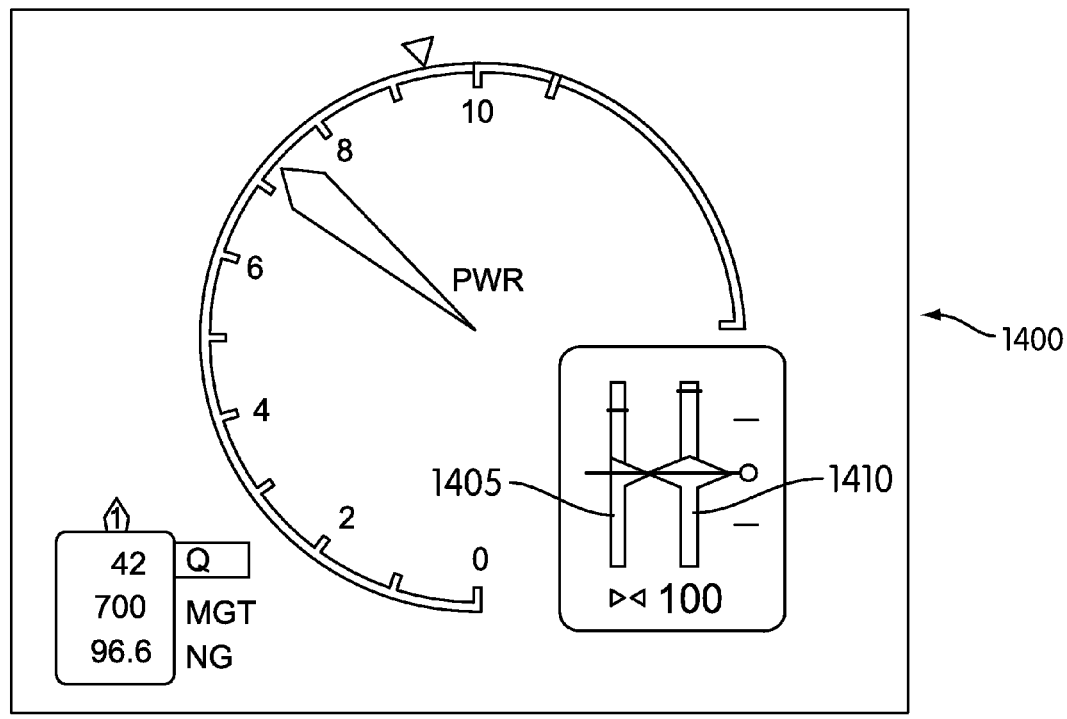
FIG. 14a-c shows the power situation indicator during operation of a single engine rotorcraft in accordance with an embodiment of the invention.
Figure 14B:
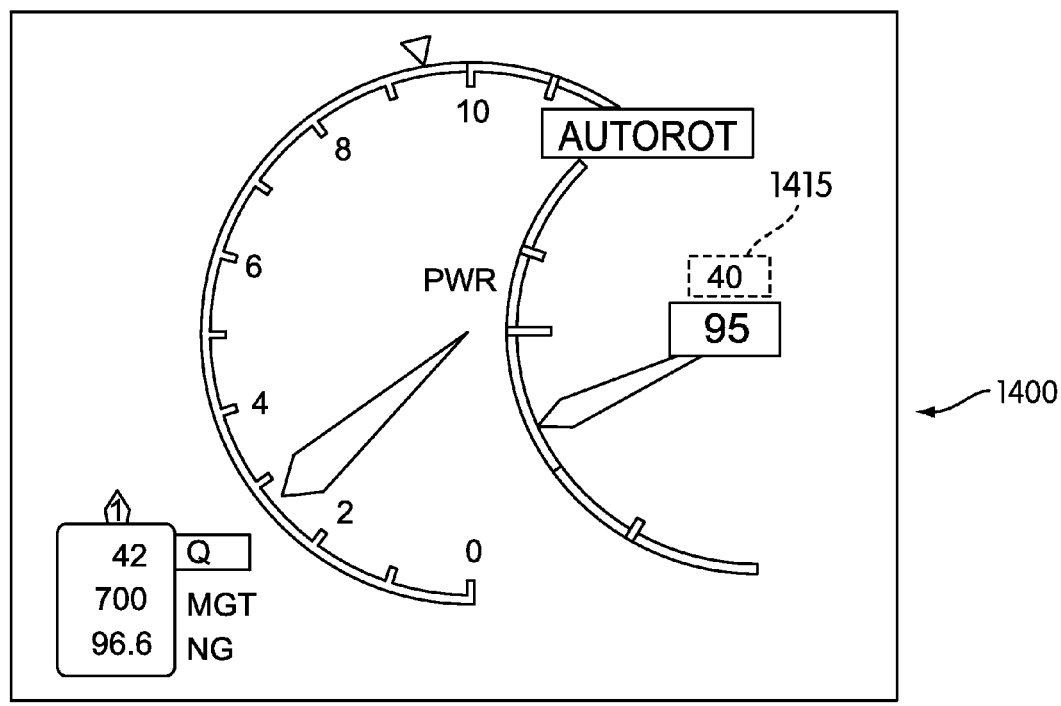
Figure 14C:
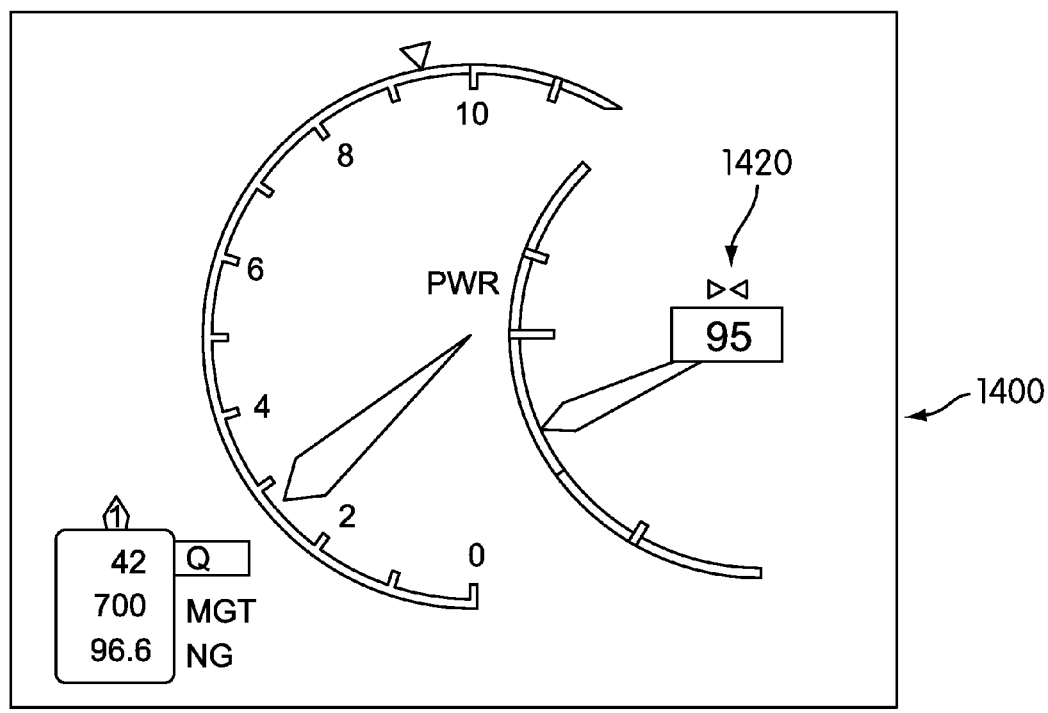

While the PSI 100 has been described for a twin engine rotorcraft, it will be appreciated that the PSI 100 could also be used to monitor power of a single engine rotorcraft. FIGS. 14*a*-*c* represent the display unit 1400 of the PSI 100 for a single engine rotorcraft as a function of flight conditions. FIG. 14*a* shows the display unit 1400 during normal flight conditions. FIG. 14*b* shows the display unit 1400 during autorotation.

As can be seen in FIGS. 14*a*-*c*, the PSI 100 includes similar features as in the twin engine. However, there is only one power needle. Furthermore, the OEI format is not required, and the number 2 engine turbine speed $N_P$ bar graph is not presented. The double-sided pointer on the rotor speed $N_R$ pointer 1405 remains, making it easily distinguishable from the turbine speed $N_P$ pointer 1410. For single engine presentation, a symbol 1420 is used (a pair of gray triangles—see FIG. 14*c*) when the turbine speed $N_P$, shown in $N_P$ display area 1415 in FIG. 14*b*, matches the rotor speed. This provides a more relevant symbol since the turbine speed $N_P$ values no longer straddle the rotor speed $N_R$.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention.

Furthermore, it will be appreciated that the different acts involved in providing power information may be executed in accordance with machine executable instructions. These machine executable instructions may be embedded in a data storage medium of the PSI. In an implementation, the machine executable instructions may be embedded in a computer product. In an embodiment, there is provided a computer program comprising a program code that, when executed on a computer system, instructs the computer system to perform any or all of the methods described herein.

What is claimed is:

1. A power situation indicator configured to provide power information in a rotorcraft, said rotorcraft including an engine, the power situation indicator comprising:
   a detection unit configured to provide a current value of each of a plurality of control parameters, each of said plurality of control parameters including a pre-determined operating limit;
   a calculation unit configured to normalize on a common power scale (a) the current value, and (b) the pre-determined operating limit of each of said plurality of control parameters, and
   a display unit configured to dynamically display on the common power scale a first moveable indicator and a second moveable indicator, said first moveable indicator being driven by one of the plurality of control parameters having the highest normalized current value and said second moveable indicator being driven by one of the plurality of control parameters having its normalized current value that is the closest to its corresponding normalized pre-determined operating limit.

2. The power situation indicator of claim 1, wherein said plurality of control parameters include mast torque ($Q_M$) or engine torque ($Q_E$) or a calculated torque (Q) based on the mast and the engine torque, gas temperature inside the engine (MGT), and gas turbine speed ($N_G$).

3. The power situation indicator of claim 1, wherein the calculation unit is configured to re-scale the common power scale and to normalize on the re-scaled common power scale (a) the current value and (b) the pre-determined operating limit of each of said plurality of control parameters when a change of a flight mode of the rotorcraft is detected, said flight mode including an all engine operative flight mode and a one engine inoperative flight mode.

4. The power situation indicator of claim 1, wherein the display unit is configured to display on the common power scale the first moveable indicator in relation to a normalized first limit, said first limit corresponding to a predetermined value of the one of the plurality of control parameters for which a maximum continuous power is obtained.

5. The power situation indicator of claim 4, wherein the first limit is about 97.2% for an all engine operative flight mode and about 99.8% for a one engine inoperative flight mode when the one of the plurality of control parameters is gas turbine speed ($N_G$).

6. The power situation indicator of claim 4, wherein the first limit is about 850° C. for an all engine operative flight mode and about 900° C. for a one engine inoperative flight mode when the one of the plurality of control parameters is gas temperature inside the engine (MGT).

7. The power situation indicator of claim 4, wherein the first limit is about 50% for an all engine operative flight mode and about 59% for a one engine inoperative flight mode when the one of the plurality of control parameters is calculated torque (Q).

8. The power situation indicator of claim 4, wherein the display unit is configured to activate and display a timer when the first moveable indicator reaches the normalized first limit.

9. The power situation indicator of claim 8, wherein, upon activation, the timer is configured to decrement during a predetermined period of time.

10. The power situation indicator of claim 9, wherein the period of time is about 5 mn.

11. The power situation indicator of claim 1, wherein, during a one engine inoperative mode, the display unit is configured to dynamically display on the common power scale a third moveable indicator, said third moveable indicator being driven by one of the plurality of control parameters having its normalized current value that is the closest to a normalized pre-determined limit.

12. The power situation indicator of claim 11, wherein the display unit is configured to activate and display a timer when the first moveable indicator reaches the normalized pre-determined limit.

13. The power situation indicator of claim 12, wherein, upon activation, the timer is configured to decrement during a pre-determined period of time.

14. The power situation indicator of claim 13, wherein the pre-determined period of time is about 30 mn, 2 mn or 30 s.

15. The power situation indicator of claim 1, wherein the display unit is configured to display on the common power scale the first moveable indicator in relation to FADEC limiting point, out-of-ground effect (OGE) hover and measured gas temperature start reference.

16. The power situation indicator of claim 1, wherein the calculation unit is configured to normalize on a common power scale restricted operating zones of each of said plurality of control parameters.

17. The power situation indicator of claim 16, wherein the display unit is configured to change a color of at least one of the first moveable indicator, the second moveable indicator and the restricted operating zones in accordance with a pre-determined logic, said pre-determined logic being based on a relationship between at least the first moveable indicator, the second moveable indicator and the restricted operating zones.

18. The power situation indicator of claim 16, wherein the display unit is configured to change a color of one of the restricted operating zones when the first moveable indicator is within the one of the restricted operating zones.

19. The power situation indicator of claim 4, wherein said second moveable indicator is moveable within one of pre-determined restricted operating zones.

20. The power situation indicator of claim 4, wherein the common power scale includes a first restricted operating zone that extends from an origin of the common power scale to the normalized first limit, a second restricted operating zone that extends from the normalized first limit to the second moveable indicator and a third restricted operating zone that extends from the second moveable indicator to an end of the common power scale.

21. The power situation indicator of claim 1, wherein said first moveable indicator is a needle and said second moveable indicator is a moveable tick mark positioned on said common power scale.

22. The power situation indicator of claim 1, wherein said common power scale is an arc having an angular radius of 270°.

23. The power situation indicator of claim 1, wherein
(a) the detection unit is configured to detect a current value of each of a second plurality of parameters, each of said second plurality of parameters including a pre-determined operating limit,
(b) the calculation unit is configured to normalize on a common rotor scale (i) the current value and (ii) the pre-determined operating limit of each of said second plurality of control parameters,
(c) the display unit is configured to dynamically display on the common rotor scale the normalized current value and the normalized pre-determined operating limit of each of said second plurality of control parameters, and
(d) said common rotor scale is concurrently displayed with said common power scale.

24. The power situation indicator of claim 23, wherein the second plurality of parameters include a power turbine speed of the engine ($N_P$) and a main rotor speed ($N_R$).

25. The power situation indicator of claim 23, wherein the common rotor scale is a multiple bar graph including a plurality of bars, a height of one of the plurality of bars corresponding to the normalized current value of one of the second plurality of control parameters.

26. The power situation indicator of claim 23, wherein the calculation unit is configured to change a format of the common rotor scale when autorotation of the rotorcraft is detected.

27. The power situation indicator of claim 26, wherein during autorotation
(a) the display unit is configured to replace the common rotor scale by a second rotor scale;
(a) the calculation unit is configured to normalize on the second rotor scale the current value of one of said second plurality of control parameters, and
(c) the second rotor scale is concurrently displayed with the common power scale.

28. The power situation indicator of claim 27, wherein said one of said second plurality of control parameters is a main rotor speed.

29. The power situation indicator of claim 27, wherein, during autorotation, the display unit is configured to concurrently display with the second rotor scale the normalized current value of each of said second plurality of control parameters obtained with said common rotor scale.

30. The power situation indicator of claim 27, wherein the display unit is configured to display an annunciation of the autorotation condition in conjunction with the change in format of the common rotor scale.

31. The power situation indicator of claim 27, wherein the display unit is configured to concurrently display with the common rotor scale the normalized current value of each of said second plurality of control parameters obtained with said common rotor scale.

32. The power situation indicator of claim 29, wherein the second plurality of control parameters include a power turbine speed of the engine ($N_P$) and a main rotor speed ($N_R$), and wherein the display unit is configured to omit a display of the normalized current value of the power turbine speed of the engine ($N_P$) when it is matched to the main rotor speed ($N_R$).

33. The power situation indicator of claim 27, wherein second rotor scale is an arc having an angular radius of 125°.

34. The power situation indicator of claim 23, wherein the display unit is configured to display on a digital readout the current value of each of the plurality of control parameters.

35. A method of providing power information in a rotorcraft, said rotorcraft including an engine, the method comprising:
- detecting a current value of each of a plurality of control parameters, each of said plurality of control parameters including a pre-determined operating limit;
- normalizing on a common power scale (a) the current value and, (b) the pre-determined operating limit of each of said plurality of control parameters; and
- dynamically displaying on the common power scale a first moveable indicator and a second moveable indicator, said first moveable indicator being driven by one of the plurality of control parameters having the highest normalized current value and said second moveable indicator being driven by one of the plurality of control parameters having its normalized current value that is the closest to its corresponding normalized pre-determined operating limit.

36. A machine readable medium encoded with machine executable instructions for providing power information in a rotorcraft including an engine in accordance with a method comprising:
- detecting a current value of each of a plurality of control parameters, each of said plurality of control parameters including a pre-determined operating limit;
- normalizing on a common power scale (a) the current value and (b) the pre-determined operating limit of each of said plurality of control parameters; and
- dynamically displaying on the common power scale a first moveable indicator and a second moveable indicator, said first moveable indicator being driven by one of the plurality of control parameters having the highest normalized current value and said second moveable indicator being driven by one of the plurality of control parameters having its normalized current value that is the closest to its corresponding normalized pre-determined operating limit.

* * * * *